United States Patent
Zhang et al.

(10) Patent No.: US 11,343,204 B2
(45) Date of Patent: *May 24, 2022

(54) DATAPATH FOR MULTIPLE TENANTS

(71) Applicant: Nicira, Inc., Palo Alto, CA (US)

(72) Inventors: Ronghua Zhang, San Jose, CA (US); Yong Wang, Sunnyvale, CA (US); Teemu Koponen, San Francisco, CA (US); Xinhua Hong, Milpitas, CA (US)

(73) Assignee: NICIRA, INC., Palo Alto, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/885,189

(22) Filed: May 27, 2020

(65) Prior Publication Data

US 2020/0287843 A1 Sep. 10, 2020

Related U.S. Application Data

(63) Continuation of application No. 16/477,793, filed on Jun. 20, 2019, now Pat. No. 10,700,997, which is a
(Continued)

(51) Int. Cl.
*H04L 49/25* (2022.01)
*H04L 67/568* (2022.01)
(Continued)

(52) U.S. Cl.
CPC .......... *H04L 49/25* (2013.01); *H04L 12/4633* (2013.01); *H04L 12/4654* (2013.01);
(Continued)

(58) Field of Classification Search
None
See application file for complete search history.

(56) References Cited

U.S. PATENT DOCUMENTS 5,521,910 A * 5/1996 Matthews ............ H04L 12/5602
370/256
5,790,546 A * 8/1998 Dobbins ............. H04L 12/5602
370/392
(Continued)

FOREIGN PATENT DOCUMENTS

CN 1514601 A 7/2004
CN 101764696 A 6/2010
(Continued)

OTHER PUBLICATIONS

Author Unknown, "11th USENIX Symposium on Networked Systems Design and Implementation", NSDI '14, Apri 2-4, 2014, 555 pages, XP061016009, USENIX Association, Seattle, WA, USA.
(Continued)

*Primary Examiner* — Davoud A Zand
(74) *Attorney, Agent, or Firm* — Adeli LLP

(57) ABSTRACT

A novel design of a gateway that handles traffic in and out of a network by using a datapath pipeline is provided. The datapath pipeline includes multiple stages for performing various data-plane packet-processing operations at the edge of the network. The processing stages include centralized routing stages and distributed routing stages. The processing stages can include service-providing stages such as NAT and firewall. The gateway caches the result previous packet operations and reapplies the result to subsequent packets that meet certain criteria. For packets that do not have applicable or valid result from previous packet processing operations, the gateway datapath daemon executes the pipelined packet processing stages and records a set of data from each stage of the pipeline and synthesizes those data into a cache entry for subsequent packets.

20 Claims, 28 Drawing Sheets

Related U.S. Application Data continuation of application No. 14/929,431, filed on Nov. 2, 2015, now Pat. No. 10,341,257.

(60) Provisional application No. 62/110,061, filed on Jan. 30, 2015.

(51) Int. Cl.

| | | |
|---|---|---|
| *H04L 12/66* | (2006.01) | |
| *H04L 45/64* | (2022.01) | |
| *H04L 69/321* | (2022.01) | |
| *H04L 12/46* | (2006.01) | |
| *H04L 67/63* | (2022.01) | |
| *H04L 41/5041* | (2022.01) | |
| *H04L 45/74* | (2022.01) | |
| *H04L 45/00* | (2022.01) | |
| *H04L 49/00* | (2022.01) | |
| *H04L 49/90* | (2022.01) | |
| *H04L 45/586* | (2022.01) | |
| *H04L 45/02* | (2022.01) | |
| *H04L 45/42* | (2022.01) | |
| *H04L 45/44* | (2022.01) | |
| *H04L 41/0654* | (2022.01) | |
| *H04L 45/122* | (2022.01) | |
| *H04L 45/745* | (2022.01) | |
| *H04L 61/2585* | (2022.01) | |
| *H04L 41/14* | (2022.01) | |
| *H04L 67/1001* | (2022.01) | |
| *H04L 69/326* | (2022.01) | |
| *H04L 69/329* | (2022.01) | |
| *H04L 47/19* | (2022.01) | |
| *H04L 45/30* | (2022.01) | |
| *H04L 43/08* | (2022.01) | |
| *H04L 43/106* | (2022.01) | |
| *H04L 49/354* | (2022.01) | |
| *H04L 67/1038* | (2022.01) | |
| *H04L 61/103* | (2022.01) | |
| *H04L 61/2503* | (2022.01) | |
| *H04L 101/663* | (2022.01) | |
| *H04L 41/50* | (2022.01) | |
| *H04L 45/28* | (2022.01) | |
| *H04L 67/1095* | (2022.01) | |

(52) U.S. Cl.
CPC .......... *H04L 12/66* (2013.01); *H04L 41/0654* (2013.01); *H04L 41/145* (2013.01); *H04L 41/5041* (2013.01); *H04L 43/08* (2013.01); *H04L 43/106* (2013.01); *H04L 45/02* (2013.01); *H04L 45/122* (2013.01); *H04L 45/306* (2013.01); *H04L 45/42* (2013.01); *H04L 45/44* (2013.01); *H04L 45/586* (2013.01); *H04L 45/64* (2013.01); *H04L 45/72* (2013.01); *H04L 45/74* (2013.01); *H04L 45/742* (2013.01); *H04L 45/745* (2013.01); *H04L 47/19* (2013.01); *H04L 49/3009* (2013.01); *H04L 49/3063* (2013.01); *H04L 49/354* (2013.01); *H04L 49/9068* (2013.01); *H04L 61/2585* (2013.01); *H04L 67/1002* (2013.01); *H04L 67/1038* (2013.01); *H04L 67/2842* (2013.01); *H04L 67/327* (2013.01); *H04L 69/321* (2013.01); *H04L 69/326* (2013.01); *H04L 69/329* (2013.01); *H04L 41/5077* (2013.01); *H04L 45/22* (2013.01); *H04L 45/28* (2013.01); *H04L 45/38* (2013.01); *H04L 61/103* (2013.01); *H04L 61/2503* (2013.01); *H04L 61/6063* (2013.01); *H04L 67/1095* (2013.01); *H04L 2012/4629* (2013.01)

(56) References Cited

U.S. PATENT DOCUMENTS

| | | |
|---|---|---|
| 6,446,149 B1 | 9/2002 | Moriarty et al. |
| 6,618,397 B1 | 9/2003 | Huang |
| 6,636,498 B1 | 10/2003 | Leung |
| 6,678,274 B1 | 1/2004 | Walia et al. |
| 8,296,394 B1 | 10/2012 | Asher |
| 8,705,533 B1 | 4/2014 | Venkatraman et al. |
| 9,223,600 B1 | 12/2015 | Ross et al. |
| 9,882,815 B2 | 1/2018 | Mehra et al. |
| 9,973,445 B2 | 5/2018 | Zhang et al. |
| 10,057,191 B2 | 8/2018 | Zhang et al. |
| 10,084,726 B2 | 9/2018 | Zhang et al. |
| 10,110,514 B2 | 10/2018 | Zhang et al. |
| 10,341,257 B2 | 7/2019 | Zhang et al. |
| 10,700,997 B2 | 6/2020 | Zhang et al. |
| 2002/0173273 A1* | 11/2002 | Spurgat ............... H04N 21/439 455/66.1 |
| 2006/0070046 A1 | 3/2006 | Balakrishnan et al. |
| 2006/0187918 A1* | 8/2006 | Smith .................. H04L 45/742 370/389 |
| 2007/0165625 A1* | 7/2007 | Eisner ................. G06Q 20/223 370/389 |
| 2007/0198698 A1* | 8/2007 | Boyd .................. H04L 67/1095 709/224 |
| 2007/0280245 A1 | 12/2007 | Rosberg |
| 2008/0209422 A1 | 8/2008 | Coha |
| 2008/0253366 A1 | 10/2008 | Zuk et al. |
| 2009/0109974 A1 | 4/2009 | Shetty et al. |
| 2009/0292858 A1 | 11/2009 | Lambeth et al. |
| 2011/0080916 A1 | 4/2011 | Davies et al. |
| 2011/0149964 A1 | 6/2011 | Judge et al. |
| 2012/0151118 A1 | 6/2012 | Flynn et al. |
| 2012/0155389 A1 | 6/2012 | McNamee et al. |
| 2012/0158993 A1* | 6/2012 | McNamee ............ H04L 45/42 709/238 |
| 2012/0158994 A1* | 6/2012 | McNamee ............ H04L 45/04 709/238 |
| 2012/0304026 A1 | 11/2012 | Khanna et al. |
| 2013/0044636 A1 | 2/2013 | Koponen et al. |
| 2013/0044751 A1 | 2/2013 | Casado et al. |
| 2013/0058346 A1 | 3/2013 | Sridharan et al. |
| 2013/0058354 A1 | 3/2013 | Casado et al. |
| 2013/0067558 A1 | 3/2013 | Markham et al. |
| 2013/0128891 A1 | 5/2013 | Koponen et al. |
| 2013/0208621 A1 | 8/2013 | Manghirmalani et al. |
| 2014/0078902 A1 | 3/2014 | Edsall et al. |
| 2014/0280522 A1* | 9/2014 | Watte ..................... H04L 51/18 709/203 |
| 2014/0369348 A1 | 12/2014 | Zhang et al. |
| 2015/0009831 A1 | 1/2015 | Graf |
| 2015/0009993 A1 | 1/2015 | Keesara et al. |
| 2015/0009995 A1 | 1/2015 | Gross, IV et al. |
| 2015/0016286 A1 | 1/2015 | Ganichev et al. |
| 2015/0032691 A1 | 1/2015 | Hall et al. |
| 2015/0063364 A1 | 3/2015 | Thakkar et al. |
| 2015/0178220 A1 | 6/2015 | Grubisic et al. |
| 2015/0271303 A1 | 9/2015 | Neginhal et al. |
| 2015/0299880 A1 | 10/2015 | Jorge et al. |
| 2016/0050148 A1 | 2/2016 | Xu et al. |
| 2016/0065576 A1 | 3/2016 | Zhang et al. |
| 2016/0127276 A1 | 5/2016 | Wu et al. |
| 2016/0142365 A1 | 5/2016 | Devarajan |
| 2016/0182379 A1 | 6/2016 | Mehra et al. |
| 2016/0226759 A1 | 8/2016 | Zhang et al. |
| 2016/0226763 A1 | 8/2016 | Zhang et al. |
| 2016/0226795 A1 | 8/2016 | Zhang et al. |
| 2016/0226821 A1 | 8/2016 | Zhang et al. |
| 2016/0226822 A1 | 8/2016 | Zhang et al. |
| 2017/0039145 A1 | 2/2017 | Wu et al. |
| 2019/0306085 A1 | 10/2019 | Zhang et al. |

FOREIGN PATENT DOCUMENTS

| | | |
|---|---|---|
| EP | 3366012 A1 | 8/2018 |
| EP | 3700144 A1 | 8/2020 |

(56) References Cited

FOREIGN PATENT DOCUMENTS

| WO | 2000051290 A2 | 8/2000 |
| WO | 2014078820 A1 | 5/2014 |
| WO | 2017079068 A1 | 5/2017 |

OTHER PUBLICATIONS

Halpern, J., et al., "Service Function Chaining (SFC) Architecture," RFC7665, Oct. 2015, 32 pages, IETF.

PCT International Search Report and Written Opinion of commonly owned International Patent Application PCT/US2016/059612, dated Jan. 4, 2017, 13 pages, International Searching Authority (EPO).

Zhang, Cathy, et al., "L4-L7 Service Function Chaining Solution Architecture Version 1.0", Jun. 14, 2015, pp. 1-36, XP055330385, retrieved from the internet: https://www.opennetworking.org/images/stories/downloads/sdn-resources/onf-specifications/L4-L7_Service_Function_Chaining_Solution_Architecture.pdf.

Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.

Li, Kang, et al., "Fast Forwarding System for Centralized Router," IEEE 2008 International Conference on Apperceiving Computing and Intelligence Analysis (ICACIA 2008), Dec. 13-15, 2008, 4 pages, IEEE, Chengdu, CN.

\* cited by examiner

Option 1 for inserting service stages

Option 2 for inserting service stages

DATAPATH FOR MULTIPLE TENANTS

CLAIM OF BENEFIT TO PRIOR APPLICATIONS

The present Application is a continuation of U.S. patent application Ser. No. 16/447,793, filed Jun. 20, 2019, now published as U.S. Patent Publication 2019/0306085. U.S. patent application Ser. No. 16/447,793 is a continuation of U.S. patent application Ser. No. 14/929,431, filed Nov. 2, 2015, now issued as U.S. Pat. No. 10,341,257. U.S. patent application Ser. No. 14/929,431 claims the benefit of U.S. Provisional Patent Application 62/110,061, filed Jan. 30, 2015. U.S. Provisional Patent Application 62/110,061, U.S. patent application Ser. No. 14/929,431, now issued as U.S. Pat. No. 10,341,257, and U.S. patent application Ser. No. 16/447,793, now published as U.S. Patent Publication 2019/0306085, are incorporated herein by reference.

BACKGROUND

A gateway is a network point that acts as an entrance to another network. In a network provided by a datacenter, a computing resource assigned to be a gateway node facilitates and regulates traffic between the datacenter network and an external physical network. The gateway is typically is associated with a router, which knows where to direct a given packet of data that arrives at the gateway, and a switch, which furnishes the actual path in and out of the gateway for a given packet. The gateway is also a compute node that provides various network traffic services, such as firewall, network address translation (NAT), security protocols (such as HTTP over SSL), etc. As datacenters become larger and provide ever more computing and networking resources, gateways also have to handle more traffic. In other words, the gateways and their associated routers and switches have to perform more switching, routing, and service tasks at greater speed.

SUMMARY

Some embodiments provide a gateway that handles traffic in and out of a network by using a datapath pipeline. The datapath pipeline includes multiple stages for performing various data-plane packet-processing operations at the edge of the network. In some embodiments, the processing stages include centralized routing stages and distributed routing stages. In some embodiments, the processing stages include service-providing stages such as NAT and firewall.

In some embodiments, the sequence of the stages that are to be executed as part of the datapath pipeline is dynamically determined according to the content of the received packet. In some embodiments, each stage of the datapath pipeline corresponds to a packet processing logical entity in a logical network such as logical router or logical switch, and the next stage identified by the packet processing at the stage corresponds to the next hop of the packet in the logical network, the next hop being another logical entity.

In some embodiments, the packet processing operations of each logical entity is based on the configuration data stored in a datapath configuration database for that logical entity. Such configuration data also defines the criteria or the rules for identifying the next hop of the packet. In some embodiments, such next hop identifying rules are stored in the DP configuration database as routing tables or forwarding tables associated with the stage. Such next hop identifying rules in some embodiments allow the datapath daemon to determine the identity of the next hop by examining the content of the packet and/or by noting the logical port through which the packet enters the logical entity.

In some embodiments, each packet processing stage is implemented as a function call for the datapath daemon thread. In some embodiments, the function being called to implement the various stages of the datapath is part of the programming of the datapath daemon operating at the core, but the called function performs different operations based on different configuration data for different network identities. In other words, the programming of the core provides functions that can be called by the datapath daemon to perform the functions of the various logical routers, logical switches, and service providing entities. The function call uses the content of the packet as an input argument. In some embodiments, the function call also uses the identity of the logical port through which the packet enters the corresponding logical entity as an input argument. In some embodiments, the function call also identifies an egress port, which is used to identify the ingress port of the next function call for the next pipeline stage. In some embodiments, each logical port of each logical entity is associated with a universally unique identifier (UUID) so that the logical port can be uniquely identified by the gateway. The UUID of a logical port also allows the datapath daemon to identify the logical entity that the logical port belongs to, which in turn allows the datapath daemon to identify the configuration data of the identified logical entity and to execute the corresponding pipeline stage.

In some embodiments, some of the logical entities/constructs/elements of a logical network are distributed among multiple physical machines in the datacenter, and some of the logical entities/entities are not distributed but are instead centralized or concentrated on one physical machine. Such a centralized router acts as a centralized point for routing packets between logical network and external routers in some embodiments. A datapath daemon in some embodiments when processing an incoming packet would execute both distributed logical entities and centralized logical entities as its pipeline stages. In some embodiments, service routers are centralized logical routers. Each service router has only one instance running on one gateway machine. A datapath daemon running on a gateway machine would therefore invoke the service router that is centralized or concentrated on the gateway machine as one of its datapath pipeline stages.

In some embodiments, the datacenter supports multiple logical networks for multiple different tenants. Different tenant logical networks share a same set of gateway machines, and each of the gateway machines provides packet switching, forwarding, routing operations for all of the connected tenant logical networks. In some embodiments, a datapath daemon is capable of executing packet-processing stages for packets to and from different logical networks belonging to different tenants. In some of these embodiments, the DP configuration database provides the configuration data (i.e. routing table, forwarding tables, etc.) and the service specifications that enable tenant-specific packet forwarding operations at the gateway.

In some embodiments, in addition to executing L3 routing and L2 routing pipeline stages, gateway datapath daemons also execute service providing stages for L4 through L7 processing. These services support end-to-end communication between source and destination applications and are used whenever a message passes from or to a user. The datapath daemon apply these services to packets at the vantage point of the edge gateway without requiring changes to applications running at either the source or the destination of the packets. In some embodiments, the datapath can include service stages for traffic filtering services (such as firewall), address mapping services (such as NAT), encryption and security services (such as IPSec and HTTPS).

In some embodiments, some or all of these service-providing stages are executed when the datapath daemon is executing the service router pipeline stages. Furthermore, in some embodiments, the datapath daemon may execute different service providing pipeline stages for different packets. In some embodiments, the datapath daemon execute different service providing stages based on the L4 flow that the packet belongs to and as well as on the state of the flow. In some embodiments, the datapath daemon executes different service providing stages based on the tenant that the packet belongs to.

Rather than performing the pipelined stages for all packets, the gateway in some embodiments caches the result previous packet operations and reapplies the result to subsequent packets that meet certain criteria, i.e., cache hit. For packets that do not have applicable or valid result from previous packet processing operations, i.e., cache miss, the gateway datapath daemon executes the pipelined packet processing stages. In some embodiments, when the datapath daemon executes the pipelined stages to process a packet, it records a set of data from each stage of the pipeline and synthesizes those data into a cache entry for subsequent packets. As the datapath pipeline is being executed, some or all of the executed stages issue data or instructions that will be used by the synthesizer to synthesize a cache entry. In some embodiments, the cache entry synthesis instructions or data issued by a pipeline stage include a cache enable field, a bitmask field, and an actions field.

The synthesizer gathers all cache entry synthesis instructions from all pipeline stages and synthesizes an entry in the flow cache from all received instructions, unless one or more pipeline stages specifies that a cache entry should not be generated. The synthesized cache entry specifies the final action for packets meeting certain criteria (i.e., belonging to certain L4 flows). When generating the cache entry, the synthesizer in some embodiments also includes a timestamp specifying the time that the cache entry is created. This timestamp will be used to determine whether the cache entry is valid for subsequent packets.

Some embodiments dynamically make updates to the DP configuration database even while the datapath daemon is actively accessing it. To ensure that the datapath daemon does not use incomplete (and therefore corrupted) configuration data for its pipeline stages while the DP configuration database is being updated, some embodiments maintain two copies of the DP configuration database. One copy of the database is used as staging area for new updates from the network controller/manager such that the datapath daemon can safely use the other copy of the database. Once the update is complete, the roles of the two database copies are reversed in an atomic fashion. In some embodiments, the network controller waits for the datapath daemon to complete its current run-to-completion packet processing pipeline stages before switching over.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a gateway that handles traffic in and out of a network by using a datapath pipeline. The datapath pipeline includes multiple stages for performing various data-plane packet-processing operations at the edge of the network. In some embodiments, the processing stages include centralized routing stages and distributed routing stages. In some embodiments, the processing stages include service-providing stages such as NAT and firewall.

Figure 1:
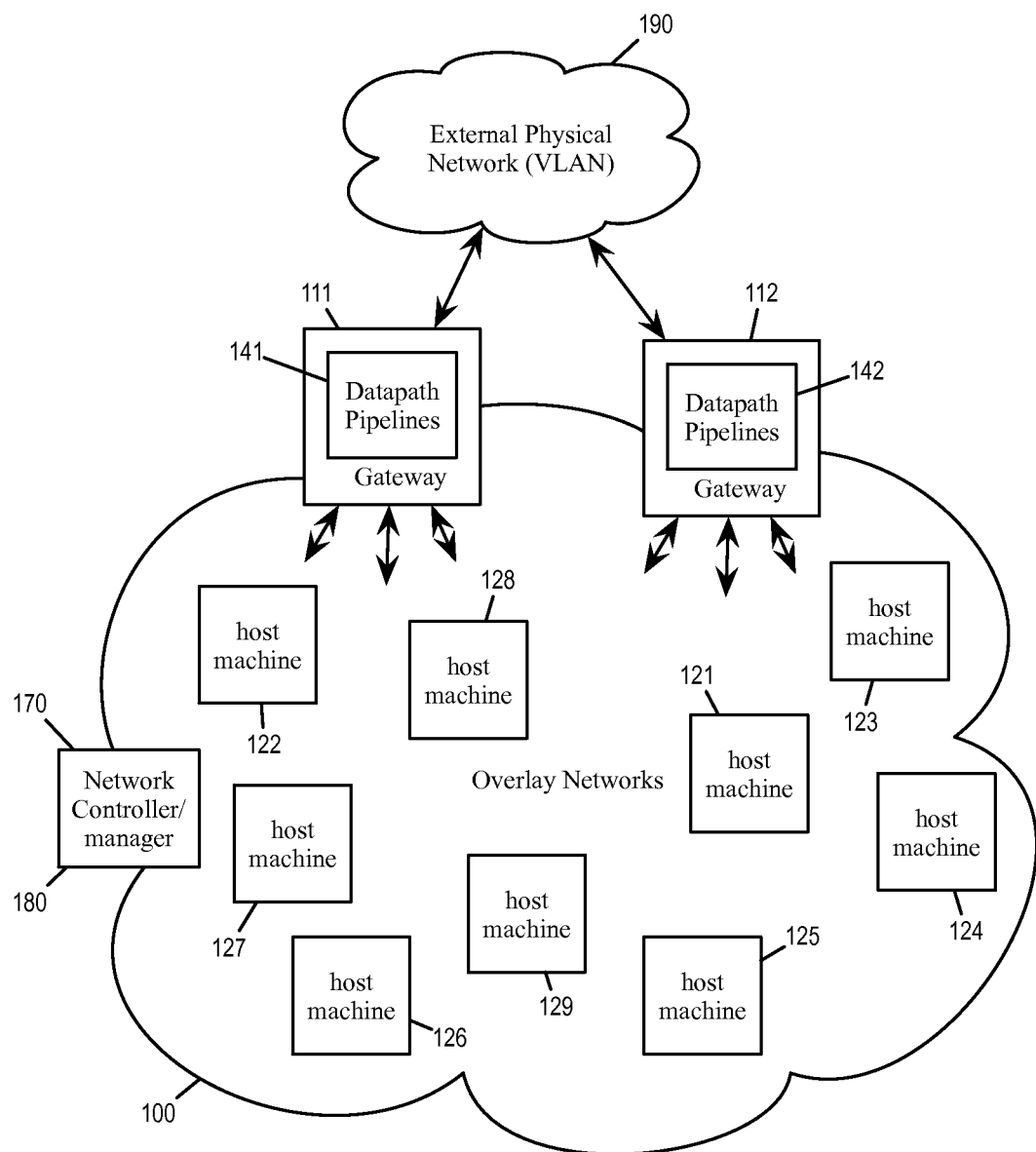
FIG. 1 conceptually illustrates a data center whose traffic to and from an external network goes through gateways.

FIG. 1 conceptually illustrates a data center 100 whose traffic to and from an external network 190 goes through gateways 111-112. Each of the gateways operates a datapath pipeline (141 and 142 respectively) for processing packets that go through the gateway.

The datacenter includes various other computing and networking resources 121-129 that interlinked by a provider network. These resources communicate with each other through the provider network and with the external network 190 by network traffic over physical communication mediums (which can include wired communications such as Ethernet or wireless communications such as WiFi). Packets from the computing and networking resources 121-129 can reach the external network 190 through one of the gateways 111-112, and packets from the external network 190 can reach the computing and network resources 121-129 through one of the gateways 111-112. A gateway of a network is therefore regarded as being at the edge of the network and therefore also referred to as an edge device.

In some embodiments, some of these resources are provided by computing devices serving as host machines 121-129. Some of these host machines operate virtualization software, which allow these host machines to host various virtual machines (VMs). A host machine running virtualization software will be described in greater detail by reference to FIG. 26 below. In some embodiments, a gateway is itself a host machine, and datapath pipeline (141 or 142) of the gateway is provided by one of the VMs running on its virtualization software. Some of these resources are running as "bare metal", i.e., without virtualization software. In some embodiments, the gateway is a bare metal computing device that operates its datapath pipeline directly over its own operating system without virtualization software.

In some embodiments, the packet traffic within the datacenter is conducted by using overlay logical networks such as Virtual eXtensible LAN (VXLAN), Generic Network Virtualization Encapsulation (GENEVE), and Network Virtualization using Generic Routing Encapsulation (NVGRE). VXLAN. In some of these embodiments, each of the host machines and the gateway machines is a VXLAN endpoint (referred to as VTEP) that transmits pack using overlay encapsulation. In some embodiments, the external physical network is conducted by VLAN, and the gateways relay the traffic between the datacenter and the external network by translating VXLAN packets to VLAN packets and vice versa.

In some embodiments, the computing and networking resources of the datacenter implement one or more logical networks, each logical network having access to the gateways 111-112 for traffic to and from the external network 190. In some embodiments, each logical network having its own set of logical switches and logical switches for conducting network traffic of the logical network. Some or all of these logical routers and switches are provided by software operating in the host machines (either as virtualization software or as programs executing on bare metal host machines). In some embodiments, some of the logical routers and switches operate in the gateways 111-112 as stages in their respective datapath pipelines 141-142. In some embodiments, the data center includes a network manager 180 for provisioning/creating the logical networks in the data center 100 and a network controller 170 (or a cluster of controller) for controlling the various logical routers and switches (including those operating in the gateways 111-112) of the various logical networks. Logical routers and switches are described in U.S. patent application Ser. No. 14/814,473, titled "Logical Router with Multiple Routing Components," filed on Jul. 30, 2015, now issued as U.S. Pat. No. 9,787,605, which is incorporated herein by reference.

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) to a set of physical machines using a set of logical forwarding elements (e.g., logical L2 and L3 switches). In some embodiments, different subsets of end machines reside on different host machines that execute managed forwarding elements (MFEs). The MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

Figure 2:
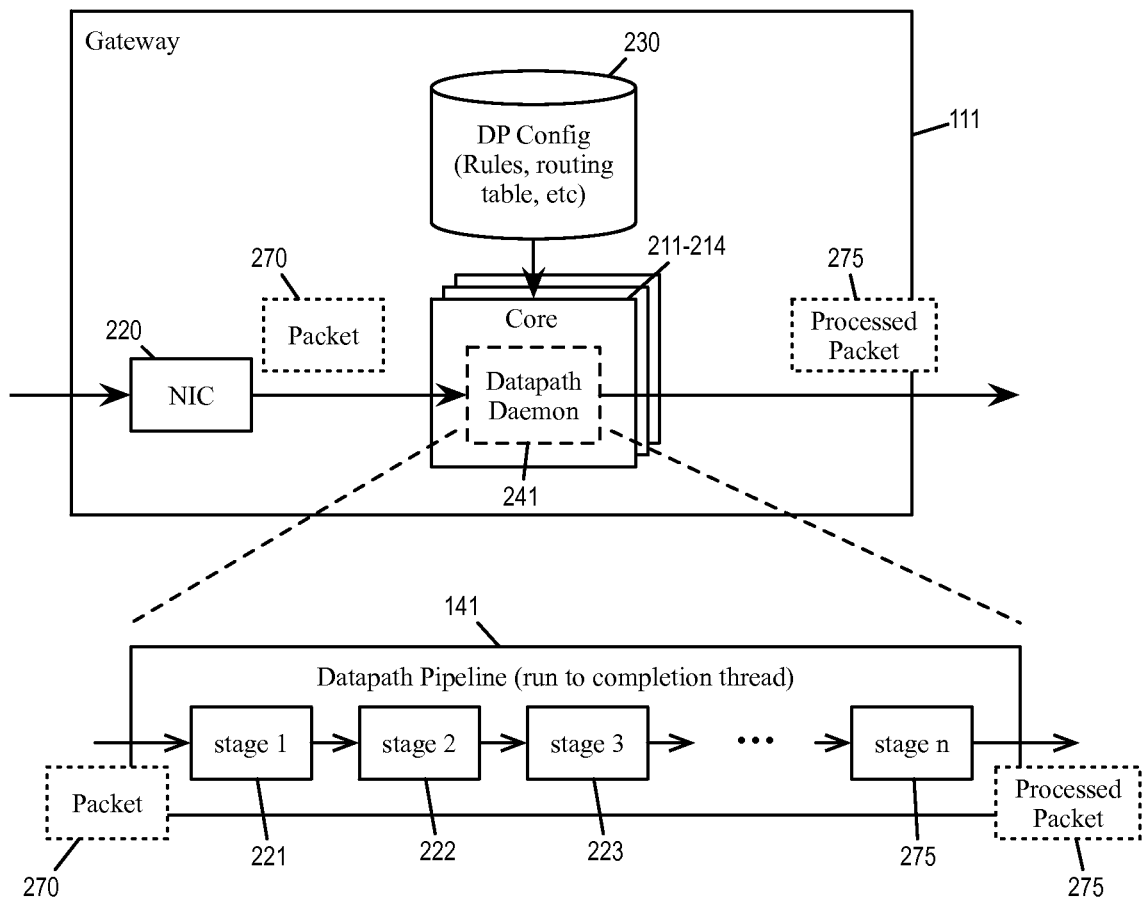
FIG. 2 illustrates a gateway machine implementing a datapath pipeline in greater detail.

FIG. 2 illustrates a gateway machine implementing a datapath pipeline in greater detail. As illustrated, the gateway 111 comprises processing cores 211-214 and a network interface controller (NIC) 220. The NIC 220 receives data packets from the network communication medium that connects the gateway 111 and provide the received packets to the cores 211-214 for processing.

Each of the processing cores is operating one or more processing threads. Specifically, the core 211 is operating the datapath pipeline 141 as a processing thread that is referred to as a datapath daemon 241. As illustrated, the datapath daemon 241 receives a packet 270 and processes the packet 270 through a series of stages 221-229 to produce a processed packet 275. In some embodiments, each core performs only one thread at a time, and each thread processes one packet at a time. In other words, each packet processing thread is a run-to-completion (RTC) thread that does not start to process another packet until it has completed processing the current packet (i.e. 270) through all of its stages 221-229.

The operations of the datapath daemon 241 is defined or specified by a datapath configuration database storage (DP configuration database) 230. The configuration data stored in DP configuration database 230 specifies what functions or operations each stage of the pipeline should perform with regard to each incoming packet. For some stages that correspond to logical routers or switches, the DP configuration database in some embodiments provide content for routing tables or forwarding tables that specify next hops. For some stages that correspond to network services such as firewall, the DP configuration database 230 provide service rules. In some embodiments, the network controller 170 (or the network manager 180) loads and updates the content of DP configuration database 230.

Several more detailed embodiments of the invention are described below. Section I discusses the dynamic pipeline stages for packet processing at gateways. Section II describes caching for gateway datapath pipeline. Section III describes the updating of configuration database for the gateway datapath pipeline. Section IV describes a software architecture of a gateway that implements the datapath pipeline. Section V describes a computing device operating virtualization software. Finally, section VI describes an electronic system with which some embodiments of the invention are implemented.

I. Dynamic Pipeline Stages

In some embodiments, the sequence of the stages that are to be executed as part of the datapath pipeline is dynamically determined according to the content of the received packet. In the context of FIG. 2, this means that the content of the packet 270 dynamically determines what processing stages are to be performed as part of the datapath pipeline 141. In some embodiments, the core 211 when processing the packet at a particular stage determines or identifies the next stage that is to be used for processing the packet. In some embodiments, each stage of the datapath pipeline corresponds to a packet-processing logical entity such as logical router or logical switch, and the next stage identified by the packet processing at the stage corresponds to the next hop of the packet in the logical network, the next hop being another packet-processing logical entity. (A packet-forwarding logical entity will be referred to as a logical entity throughout this document for simplicity).

In some embodiments, a pipeline stage that corresponds to a logical router or a logical switch is a complete functional model of the logical router or switch, i.e., it specifies all of its logical ports, its routing/forwarding tables, the services it provides, its security policies, its encapsulation protocols, etc. In some embodiments, all of these features of the logical routers are specified by a package of computer executable code and can be performed as a pipeline stage by a function call. It performs forwarding either by destination MAC (L2 switching) or destination IP (L3 routing). Such a pipeline stage is therefore distinguishable from a flow table under OpenFlow or Open vSwitch, which performs flow forwarding according to a set of flow entries, each entry describing a match condition and a corresponding action.

In some embodiments, the packet processing operations of each logical entity (i.e., pipeline stage) is based on the configuration data stored in the DP configuration database for that logical entity. Such configuration data also defines the criteria or the rules for identifying the next hop of the packet. In some embodiments, such next hop identifying rules are stored in the DP configuration database as routing tables or forwarding tables associated with the stage. Such next hop identifying rules in some embodiments allow the datapath daemon to determine the identity of the next hop by examining the content of the packet (e.g., its source and destination addresses) and/or by noting the logical port through which the packet enters the logical entity. In other words, the DP configuration database can be regarded as storing the logical relationship between the various hops of a logical network, and the datapath daemon processes each packet by traversing the logical network according to those logical relationships and the content of the packet.

Figure 3:
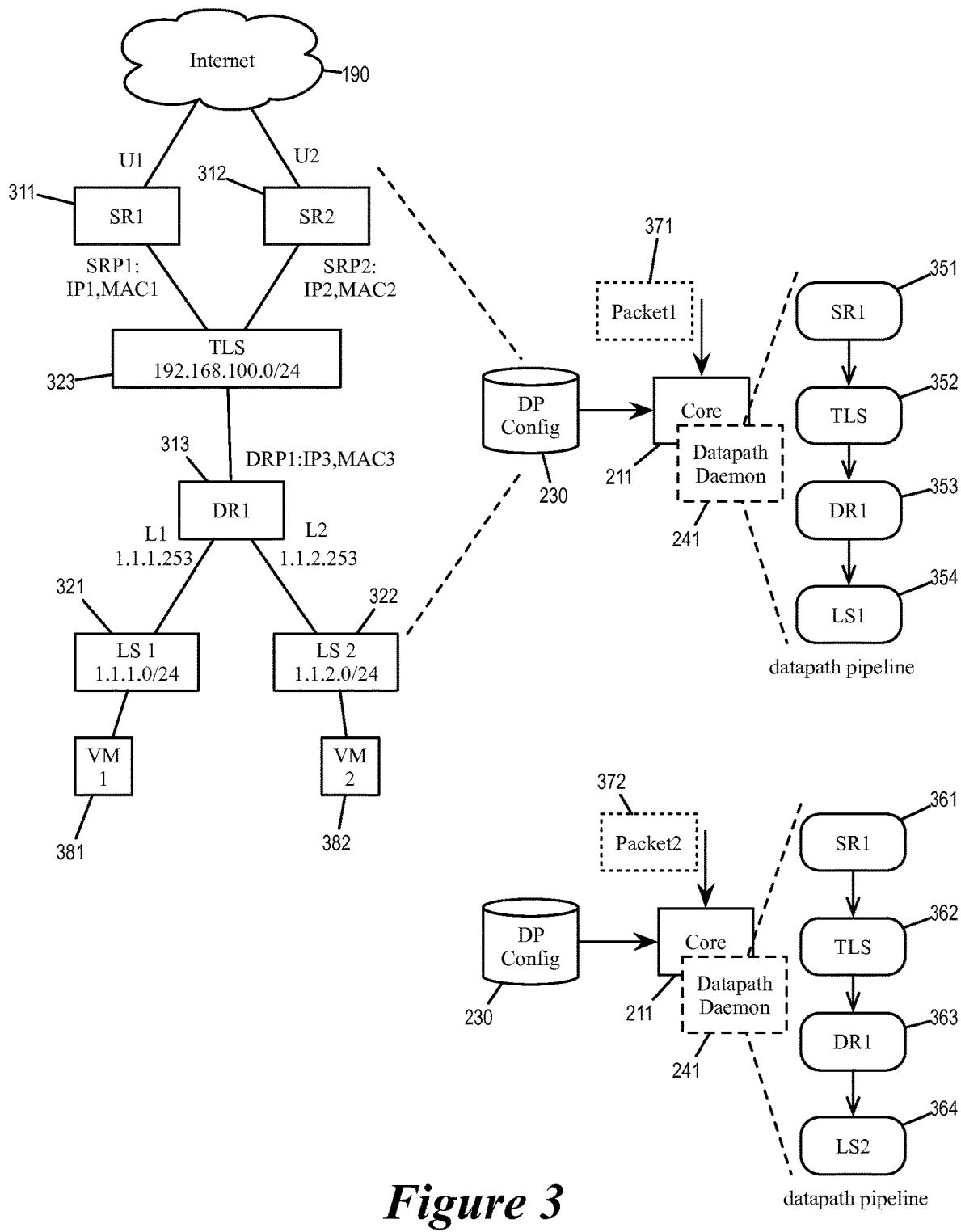
FIG. 3 illustrates the dynamic identification of processing stages by a datapath daemon.

FIG. 3 illustrates the dynamic identification of processing stages by a datapath daemon. As illustrated, the core 211 is operating the datapath daemon 241 as a processing thread. The datapath daemon 241 is processing a packet 371 according to a logical network 300, whose configuration data is stored in the DP configuration database 230.

As illustrated, the logical network 300 includes service routers 311 and 312 (SR1 and SR2), logical switches 321, 322, and 323 (LS1, LS2, and TLS), and distributed router 313 (DR). Each of the service routers SR1 and SR2 has an uplink (U1 and U2) for connecting to the external network 190. The logical switch TLS is a transit logic switch that provides L2 switching for packets from routers SR1, SR2, and DR1, which are assigned logical ports with MAC address "MAC1", "MAC2", and "MAC3" respectively. The distributed router DR1 on the other hand provides L3 routing among L2 network segments defined by the logical switches LS1, LS2, and TLS.

The figure illustrates how the datapath daemon 241 processes two different packets 371 and 372 according to the configuration data stored in the DP configuration database 230. The two different packets cause the datapath daemon 241 to traverse the logical network 300 differently and to execute different corresponding pipeline stages.

The packet 371 is a packet from the external network 190 that is destined for a VM 381 (VM1) behind the L2 segment of the logical switch LS1. The processing core 211 upon receiving the packet 371 performs a packet processing stage 351 that corresponds to the service router SR1. The operations of the stage 351 are defined by the configuration in the DP configuration database. The service router SR1 logically forwards the packet to the logical switch TLS, which causes the datapath daemon 241 to identify a next packet processing stage 352 that corresponds to the logical switch TLS.

The processing stage 352 is configured by DP configuration database 230 to perform L2 switching operations as the logical switch TLS, which forwards the packet 371 from its "MAC1" port to its "MAC3" port. The MAC3 port correspond to the distributed router DR1, and the datapath daemon 241 correspondingly identifies a next packet processing stage 353 that corresponds to DR1.

The processing stage 353 is configured by the DP configuration database 230 to perform L3 routing operations as the distributed logical router DR1, which operates according to a routing table provided by the DP configuration database 230. According to the routing table and the destination IP address of the packet 371, the logical router DR1 routes the packet 371 from the L2 segment defined by the logical switch TLS to an L2 segment defined by the logical switch LS1. Correspondingly, the datapath daemon 241 identifies a next packet processing stage 354 that corresponds to LS1.

The processing stage 352 is configured by DP configuration database 230 to perform L2 switching operations as the logical switch LS1, which forwards the packet 371 toward the virtual machine VM1 (381) according to the packet's destination MAC address.

The packet 372 is destined for a VM 382 that is attached to a L2 segment defined by the logical switch LS2. The packet 372 causes the datapath daemon 241 to identify a packet processing stage 361 to perform the service router SR1, then identify a packet processing stage 362 to perform the logical switch TLS, then identify a packet process stage 363 to perform the distributed router DR. When processing the packet 372, the packet processing stage 363 routes the packet from the L2 segment defined by the logical switch TLS to an L2 segment defined by the logical switch LS2. Correspondingly, the datapath daemon 241 identifies a next packet processing stage 364 that corresponds to the logical switch LS2, which forwards the packet 372 toward the virtual machine VM2 (382) according to the packet's destination MAC address.

In the example of FIG. 3, though the datapath daemon 241 operate according to the same DP configuration database 230, the two different packets 371 and 372 causes the datapath daemon to traverse the logical network 300 differently and performed different packet processing stages (SR1-TLS-DR1-LS1 for the packet 371, SR1-TLS-DR1-LS2 for the packet 372).

In some embodiments, each packet processing stage is implemented as a function call for the datapath daemon thread. In some embodiments, a function (also known as a subroutine or a procedure) is a sequence of program instructions that are packaged as unit to perform a specific task. In some embodiments, the function being called to implement the various stages of the datapath is part of the programming of the datapath daemon operating at the core, but the called function performs different operations based on different configuration data for different network identities. In other words, the programming of the core provides functions that can be called by the datapath daemon to perform the functions of the various logical routers, logical switches, and service providing entities.

The function call uses the content of the packet as an input argument. In some embodiments, the function call also uses the identity of the logical port through which the packet enters the corresponding logical entity as an input argument. In some embodiments, the function call also identifies an egress port, which is used to identify the ingress port of the next function call for the next pipeline stage.

Figure 4:
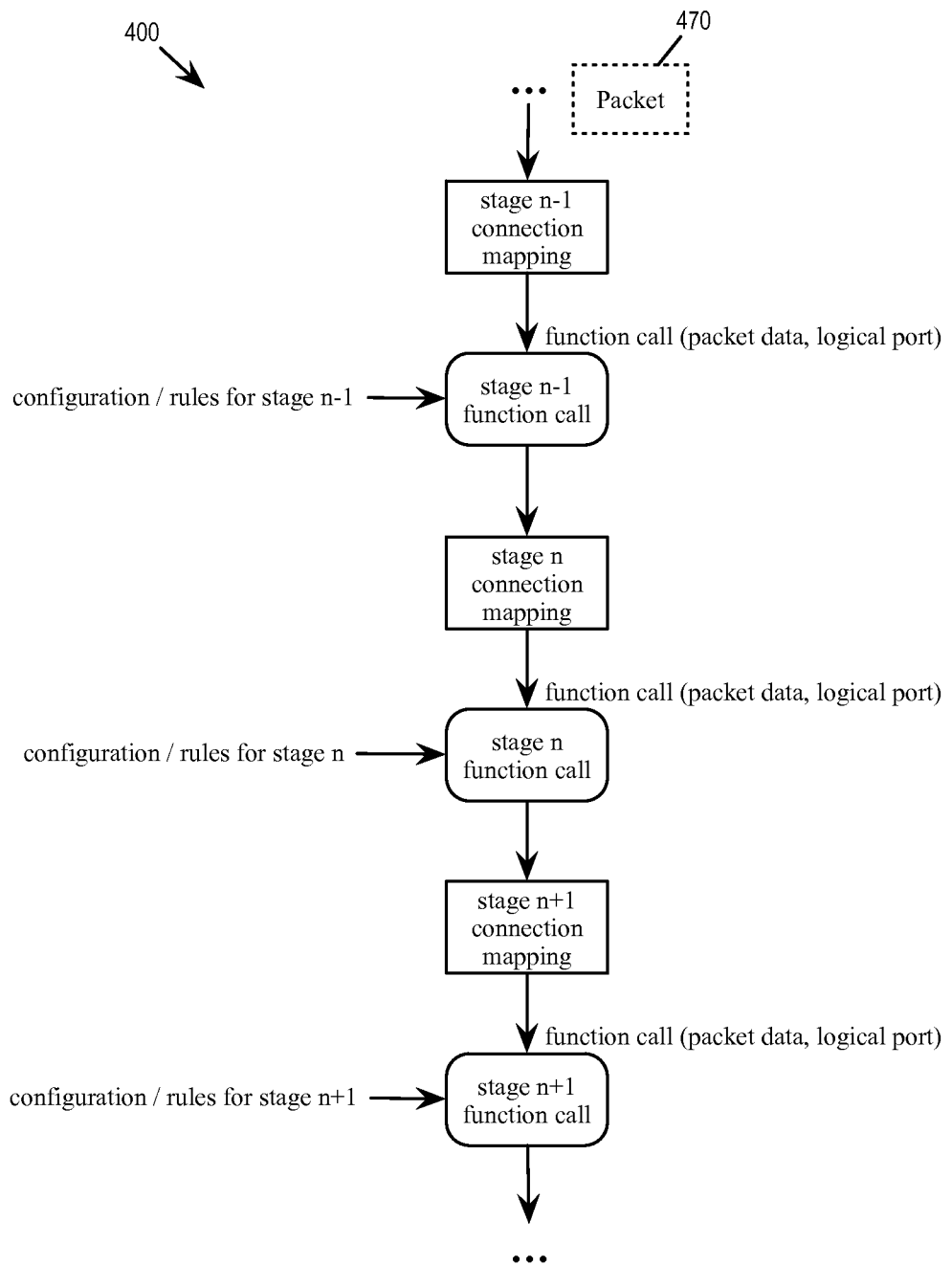
FIG. 4 conceptually illustrates a datapath daemon executing each stage of the datapath pipeline as a function call.

FIG. 4 conceptually illustrates a datapath daemon 400 executing each stage of the datapath pipeline as a function call. As illustrated, the datapath daemon is processing a packet 470 according to a logical network. For each stage, the datapath daemon performs a function call that executes a set of instructions corresponding to the operations of a packet processing stage (e.g., a logical router, logical switch, service routers, etc.). The function call operates on the packet 470 based on a set of configuration data (i.e., rules table, routing table, forwarding table, etc.) for that function/stage. The result of the function call is used by the datapath daemon 400 to identify the next hop and to perform the next function call as the next stage. Each function call uses the packet as an input argument, along with other information such as the identity of the logical entity or the logical port that the packet was forwarded to.

Figure 5:
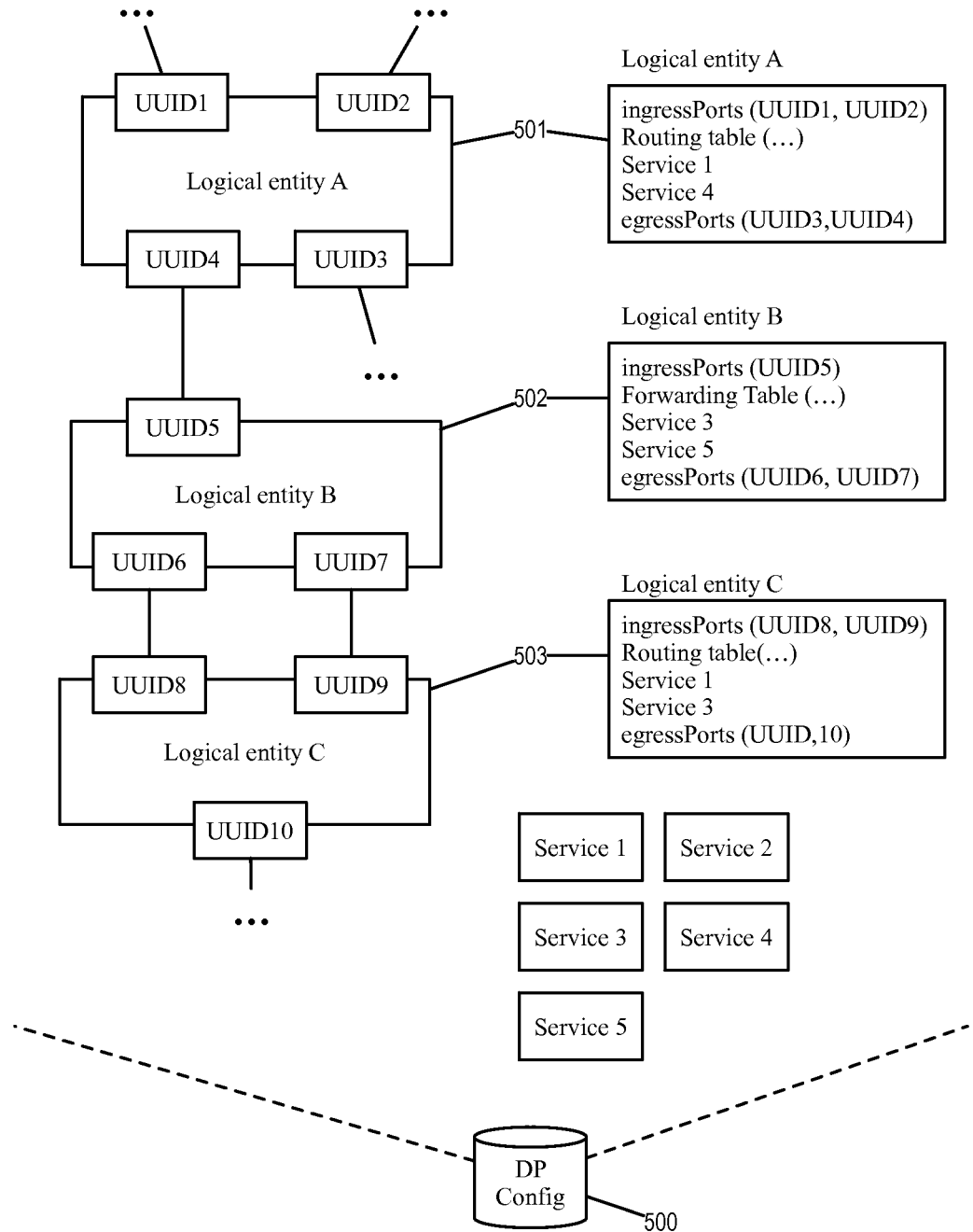
FIG. 5 illustrates an example DP configuration database that provides the configuration data for each datapath pipeline stage.

For some embodiments, FIG. 5 illustrates an example DP configuration database 500 that provides the configuration data for each datapath pipeline stage, as well as the connection mapping between the different logical entities that allows the datapath daemon to identify the next pipeline stage. In some embodiments, such connection mapping specifies the connection destination of each egress port of each logical entity, whether it's the ingress port of another logical entity, or a connection that exits the gateway (such as the uplink to the external network). Such connection mapping therefore effectively provides the logical topology of the network for some embodiments.

In some embodiments, each logical port of each logical entity is associated with a universally unique identifier (UUID) so that the logical port can be uniquely identified by the gateway. The UUID of a logical port also allows the datapath daemon to identify the logical entity that the logical port belongs to, which in turn allows the datapath daemon to identify the configuration data of the identified logical entity and to execute the corresponding pipeline stage.

As illustrated, the DP configuration database 500 specifies several logical entities 501-503 (logical entities A, B, C) and their corresponding logical ports. Each logical port is associated with a UUID. For example, the logical entity 501 has logical ports having UUIDs UUID1, UUID2, UUID3, and UUID4, while the logical entity 502 has logical ports having UUIDs UUID5, UUID6, and UUID7. The DP configuration database also specifies the connection of each logical port. For example, the logical port UUID4 is connected to logical port UUID5, logical port UUID6 is connected to logical port UUID8, logical port UUID7 is connected logical port UUID9, etc.

The DP configuration database 500 also includes the configuration data for each logical entity, which includes the ingress ports and egress ports of the logical entity, as well as its routing or forwarding tables, service provided or enabled on that logical entities, etc. In some embodiments, such configuration data includes other data that will be consumed by the datapath during packet processing such as MAC to VTEP mapping tables.

Figure 6:
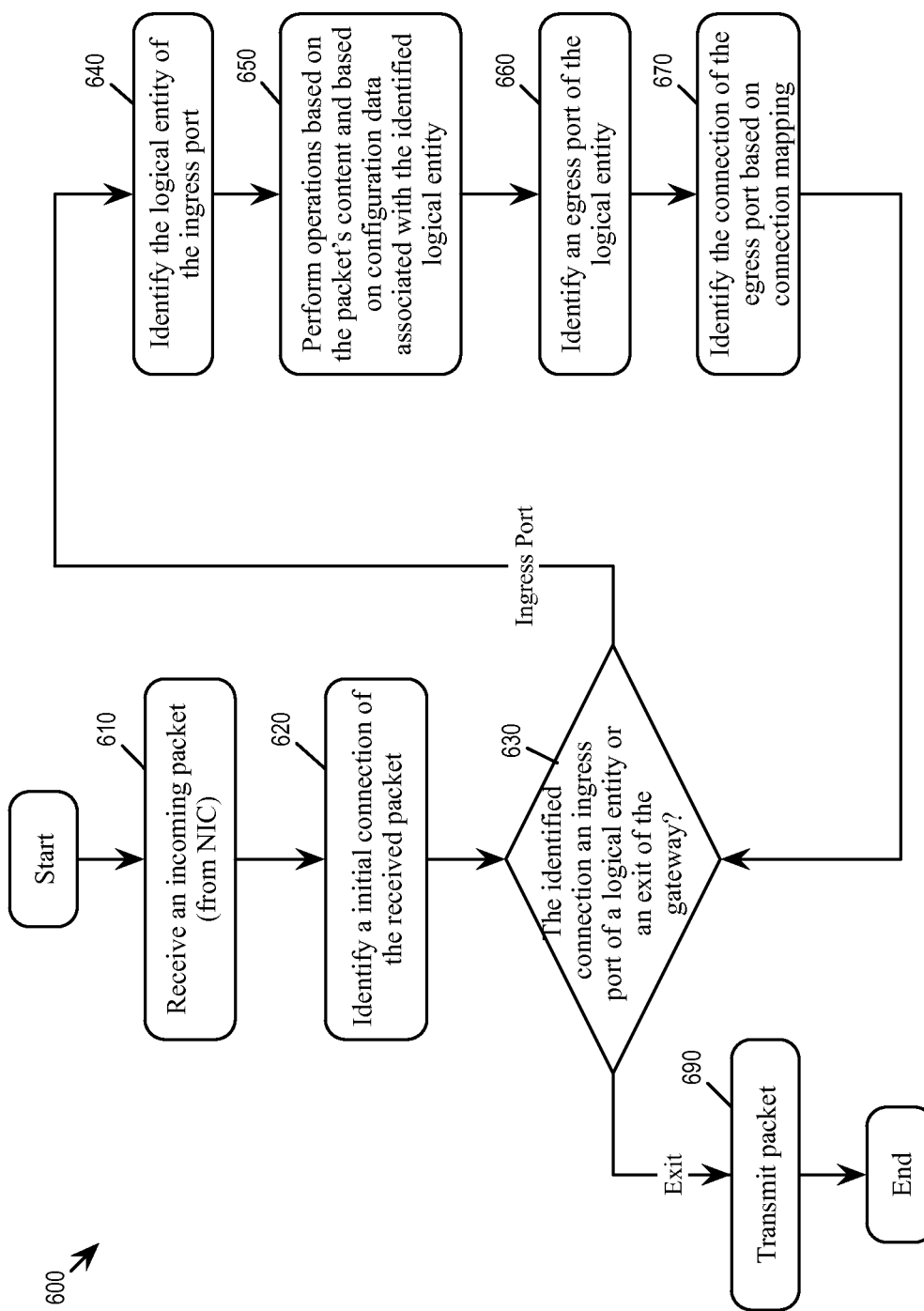
FIG. 6 conceptually illustrates a process performed by a process core when using DP configuration database to perform datapath pipeline.

FIG. 6 conceptually illustrates a process 600 performed by a process core when using DP configuration database to perform datapath pipeline. The process starts when it receives (at 610) an incoming packet. The process then identifies (620) an initial connection for the received packet. In some embodiments, this identification is based on the content of the packet, such as the packet's header fields. In some embodiments, this connection is associated with an UUID so it will have a connection mapping according to the DP configuration database.

The process then determines (at 630) whether the identified connection is an ingress port of a logical entity or an exit port of the gateway. In some embodiments, the process examines the connection mapping provided by the DP configuration database to identify the destination of the connection. If the connection is to an ingress port of another logical entity within the gateway, the process proceeds to 640. If the connection is an exit port of the gateway, the process proceeds to 690.

At 640, the process identifies the logical entity based on the connection. At this stage, the process has determined that the connection is connected to an ingress port of a logical entity. By using the DP configuration database, the process is able to identify the logical entity for which the connection is an ingress port. For example, in FIG. 5, the logical port UUID5 is an ingress port of the logical entity B (501) according to the DP configuration database 500.

The process then performs (at 650) operations for the logical entity. These operations are specified by the configuration data associated with the identified logical entity, e.g., routing table, forwarding table, service rules, etc. The result of these operations is also based on the content of the packet, such as the packet's source and destination addresses. This operation in some embodiments corresponds to a function call, which executes a series of instructions by referencing the configuration data in DP configuration database.

The process then identifies (at 660) an egress port of the logical entity. For logical entities that are logical switches or logical routers, this egress port identification in some embodiments correspond to looking up the forwarding tables or routing tables to perform routing based on the identity of ingress port or the content of the packets. In some embodiments, the identification of the egress port (and hence the next processing stage or next hop) is based on some of the following parameters in the packet: (1) the source and destination MAC addresses of the packet used for L2 switching/forwarding; (2) the source and destination IP address of the packet used for L3 routing; (3) the source and destination port of the packet used for L4 transport/connection/flow processing; (4) the identity of the logical network or the tenant that the packet belongs to. The configuration data from DP configuration database provides rules that specify the actions to be taken at each stage based on these packet parameters.

Next, the process identifies (at 670) the connection of the egress port based on the connection mapping provided by the DP configuration database. For example, in FIG. 5, the logical port UUID4 is connected to the logical port UUID5 according to the DP configuration database 500. The process then returns to 630 to determine whether the egress port is connected to an exit port of the gateway or another logical entity.

At 690, the process ends the datapath pipeline and transmits the packet to its destination physical router or host machine. The process then ends. In some embodiments, the gateway communicates with other host machines in the datacenter as a VTEP of an overlay network (e.g., VXLAN), and the next hop is behind another VTEP in the datacenter. In this case, the process encapsulates the packet according to the overlay and transmits the encapsulated packet to the destination VTEP. If the next hop is a physical router in the external network (which is usually VLAN), the gateway remove overlay encapsulation and bridges the packet to the physical router. In some embodiments the DP configuration provides the mapping that maps the destination MAC address of the packet to a corresponding VTEP address.

a. Centralized and Distributed Pipeline Stages

In some embodiments, some of the logical entities/entities/elements of a logical network distributed among multiple physical machines in the datacenter, i.e., each of these host machines has a copy or instance of the distributed logical entity. A packet requiring processing by a distributed logical entity can be processed by any machine that is running an instance of the distributed logical entity. On the other hand, some of the logical entities/entities are not distributed but are instead centralized or concentrated on one physical machine, i.e., the logical entity has only one physical instance. Such a centralized router acts as a centralized point for routing packets between a logical network and external routers in some embodiments. A packet requiring processing by a centralized logical entity has to be forwarded to the machine that is operating the centralized logical entity. Distributed logical routers and centralized logical routers are described in U.S. patent application Ser. No. 14/814,473, titled "Logical Router with Multiple Routing Components," filed on Jul. 30, 2015, now issued as U.S. Pat. No. 9,787,605.

A datapath daemon in some embodiments when processing an incoming packet would execute both distributed logical entities and centralized logical entities as its pipeline stages. In some embodiments, service routers are centralized logical routers. Each service router has only one instance running on one gateway machine. A datapath daemon running on a gateway machine would therefore invoke the service router that is centralized or concentrated on the gateway machine as one of its datapath pipeline stages.

In some embodiments, the configuration data (DP configuration database) that controls the operation of a service router stage includes definitions of any services the logical router should provide, whether the logical router will be configured in active-active or active-standby mode, how many uplinks are configured for the logical router, the IP and MAC addresses of the uplinks, the L2 and L3 connectivity of the uplinks, the subnets of any southbound interfaces of the logical router, any static routes for the routing information base (RIB) of the logical router, as well as other data.

Figure 7:
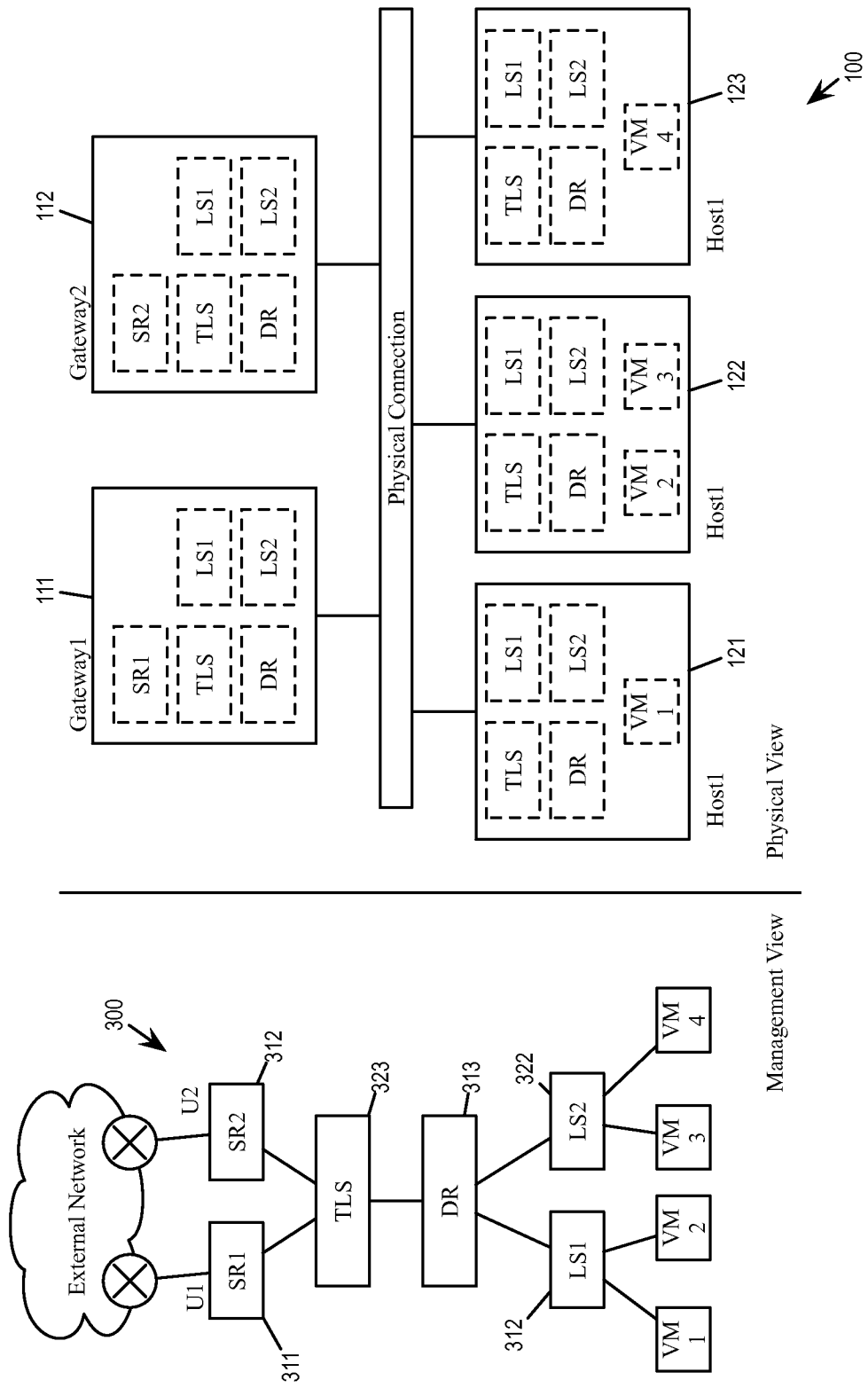
FIG. 7 illustrates a logical network with both distributed and centralized logical entities.

FIG. 7 illustrates a logical network with both distributed and centralized logical entities. Specifically, the figure illustrates a logical view and a physical view of the logical network 300. The logical view of the logical network 300 shows the logical relationship and connection between the various logical entities of the network. The physical view of the logical network 300 shows the physical instantiation of the various logical entities in the physical host machines and the physical gateways of the datacenter.

According to the logical view, the logical network 300 includes service routers 311 and 312 (SR1 and SR2), logical switches 321, 322, and 323 (LS1, LS2, and TLS), and distributed router 313 (DR). Among these logical entities, the service routers SR1 and SR2 are centralized logical entities, while LS1, LS2, TLS and DR are distributed logical entities.

Some embodiments provide a distributed logical router implementation that enables first-hop routing in a distributed fashion (rather than concentrating all of the routing functionality at the gateways). In the physical realization, the logical router of some embodiments includes a single distributed routing component (also referred to as a distributed router or a DR) and one or more service routing components (also referred to as service routers or SRs). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more physical routers that are capable of performing routing operations. The DR of some embodiments is responsible for first-hop distributed routing between logical switches and/or other logical routers that are logically connected to the logical router. The service routers (SRs) span only the edge nodes of the logical networks and are responsible for delivering services that are not implemented in a distributed fashion (e.g., some stateful services).

The physical view of the network shows the physical instantiation of these centralized and distributed logical entities in the actual physical machines of the datacenter 100. As illustrated, the datacenter 100 includes gateways 111-112 and host machines 121-123 that are interconnected by physical connections. The instances of the distribute elements TLS, LS1, LS2, and DR are distributed across the gateways 111-112 and the host machines 121-123. In some embodiments, different physical instances of a distributed element operate according to a same set of forwarding tables. However, the centralized element SR1 is active only in the gateway 111 while the centralized element SR2 is active only in gateway 112. In other words, only the datapath daemon of gateway 111 executes SR1 as a pipeline stage and only the datapath daemon of gateway 112 executes SR1 as a pipeline stage.

Figure 8:
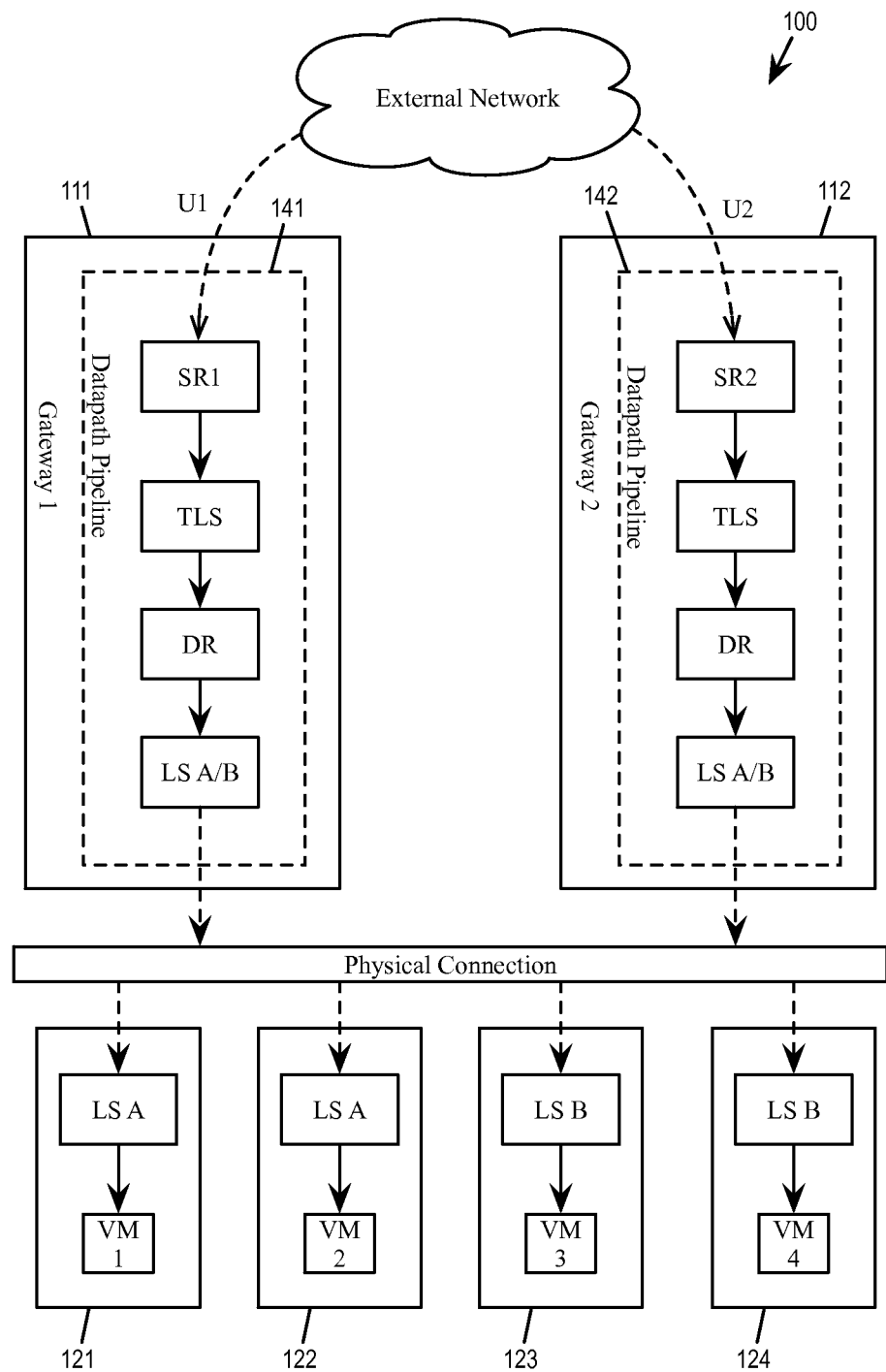
FIG. 8 illustrates gateway datapath daemons executing pipeline stages for incoming packets from the external network to the logical networks of the datacenter.

FIG. 8 illustrates gateway datapath daemons executing pipeline stages for incoming packets from the external network to the logical networks of the datacenter (also known as southbound traffic). As illustrated, packets received from the external network through the uplink U1 is processed by the gateway 111, whose datapath daemon 141 executes pipeline stages that correspond to SR1, TLS, DR, and LS-A (or LS-B, depending on the destination L2 segment of the packet). The processed packet is then transmitted to one of the host machines to be forwarded to the destination VM. On the other hand, packets received from the external network through the uplink U2 is processed by the gateway 112, whose datapath daemon 142 executes pipeline stages that correspond to SR2, TLS, DR, and LS-A (or LS-B, depending on the destination address of the packet). The processed packet is then transmitted to one of the host machines to be forwarded to the destination VM. In some embodiments, the logical switch stage (LS-A or LS-B) of the datapath daemon identifies the host machine of the destination VM.

Both gateways 111 and 112 execute pipeline stages that correspond to transit logical switch TLS, the distributed router DR, and the logical switches LS-A and LS-B are distributed, as these are distributed logical network constructs. However, only the datapath daemon of gateway 111 performs the pipeline stage for the service router SR1 because SR1 is a centralized router located at the gateway 111, and only the datapath daemon of gateway 112 performs the pipeline stage for the service router SR2 because SR2 is a centralized router located at the gateway 112.

Figure 9:
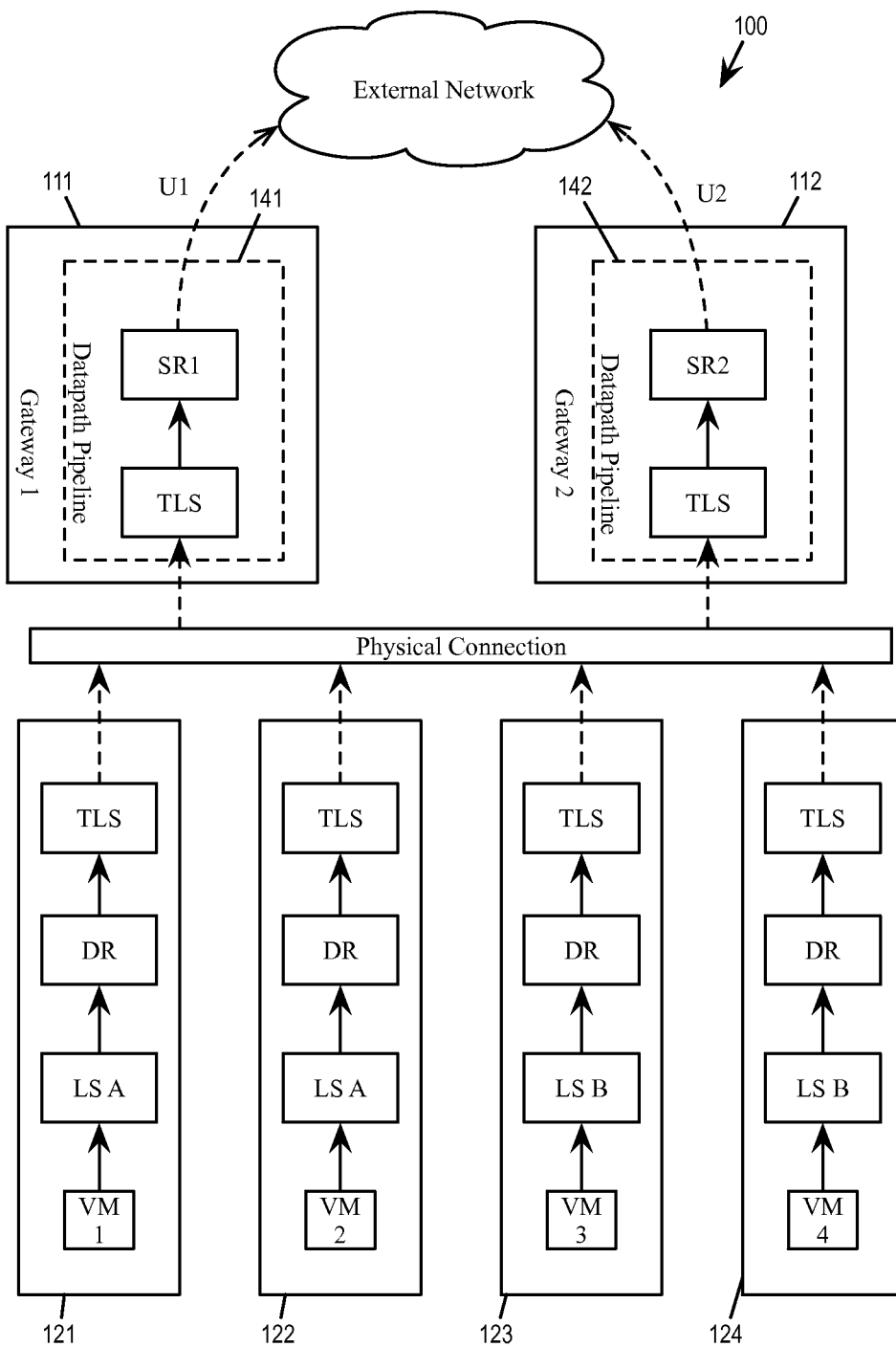
FIG. 9 illustrates gateway datapath daemons executing pipeline stages for outgoing packets from the logical networks of the datacenter to the external network.

FIG. 9 illustrates gateway datapath daemons executing pipeline stages for outgoing packets from the logical networks of the datacenter to the external network (also known as northbound traffic). As illustrated, packets originating from VMs operating in host machines went through pipeline stages that correspond to LS-A (or LS-B, depending on the L2 segment of the source VM), DR, and TLS. The TLS stage of the host machines identifies the next hop router, which is either SR1 in the gateway 111 or SR2 in the gateway 112. In some embodiments, the selection of service router is based on the destination address of the packet as well as routing decisions made earlier in the pipeline.

For a packet that is sent to the gateway 111, the datapath daemon 141 of gateway 111 executes pipeline stages corresponding to TLS and SR1 before relaying the packet to the external network through uplink U1. For a packet that is sent to the gateway 112, the datapath daemon 142 of the gateway 112 executes pipeline stages corresponding to TLS and SR2 before relaying the packet to the external network through uplink U2.

b. Datapath Pipeline for Different Tenants

In some embodiments, the datacenter supports multiple logical networks for multiple different tenants. Different tenant logical networks share a same set of gateway machines, and each of the gateway machines provides packet switching, forwarding, routing operations for all of the connected tenant logical networks. In some embodiments, a datapath daemon is capable of executing packet-processing stages for packets to and from different logical networks belonging to different tenants. In some of these embodiments, the DP configuration database provides the configuration data (i.e. routing table, forwarding tables, etc.) and the service specifications that enable tenant-specific packet forwarding operations at the gateway.

Figure 10:
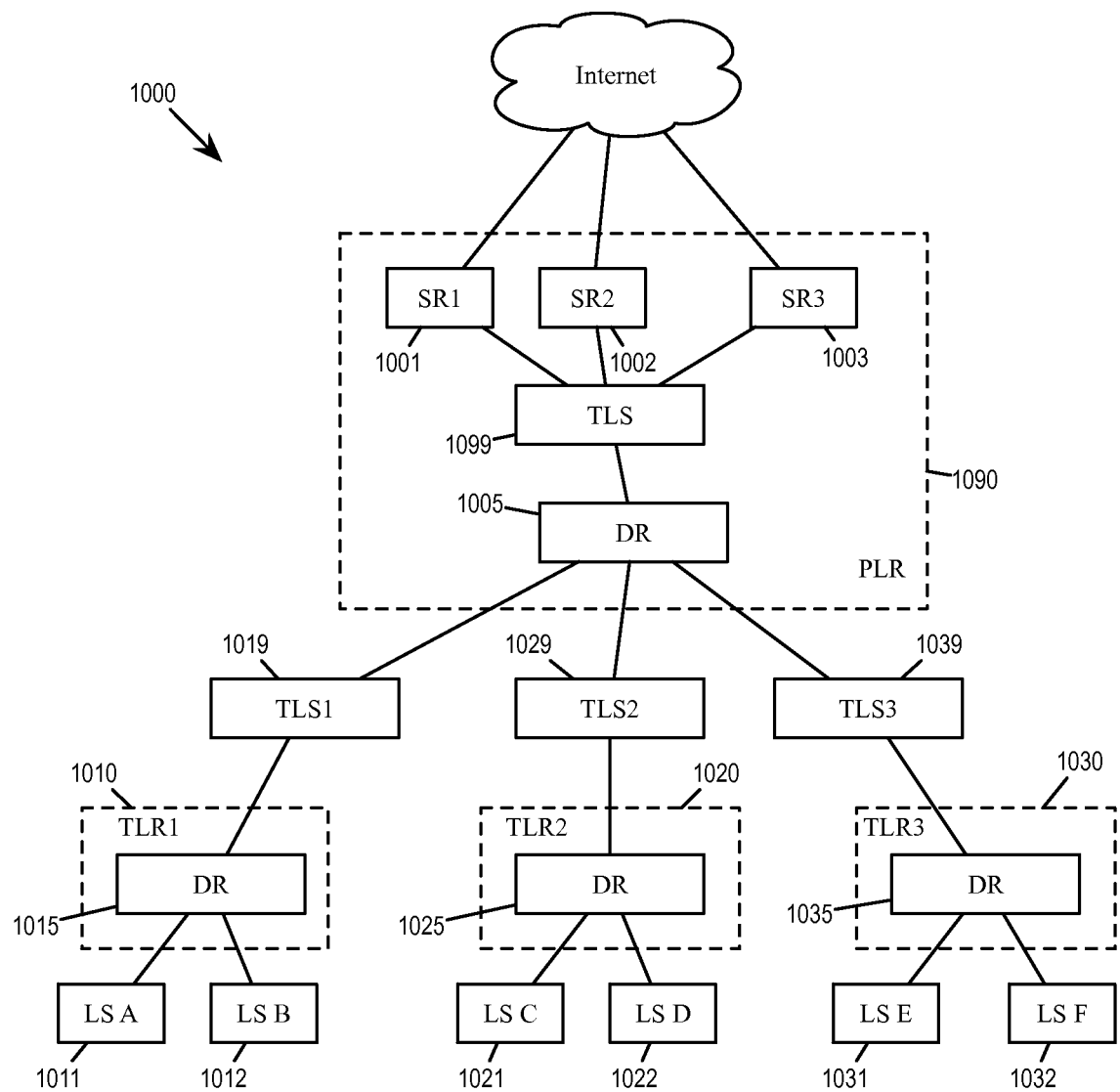
FIG. 10 illustrates a logical view of the overall network of a datacenter.

Different tenant logical networks have different packet-processing logical entities, e.g., different logical routers and logical switches. FIG. 10 illustrates a graph 1000 of the logical view of the overall network of a datacenter. The overall network includes various logical entities belonging to different tenant logical networks as well as a set of logical entities provided by the datacenter. These datacenter provided logical entities are shared by all of the tenants in order to access the external network through the gateway and to use the services provided the gateway.

According to the graph 1000, the overall network of the datacenter includes a provider logical router (PLR) 1090 and tenant logical routers (TLR) 1010, 1020, and 1030 (TLR1, TLR2, and TLR3). The PLR 1090 is connected with the TLR1 1010 through a transit logical router 1019 (TLS1), with the TLR2 1020 through a transit logical router 1029 (TLS2), and with the TLR3 1030 through a transit logical router 1039 (TLS3). TLR1 is for performing L3 traffic of a tenant 1, TLR2 is for performing L3 traffic of a tenant 2, and TLR3 is for performing L3 traffic of a tenant 3. The logical networks of the different tenants are joined together by the PLR 1090. The PLR 1090 servers as the intermediate logical router between the various tenant logical networks and the external physical network.

In some embodiments, the logical router is part of a two-tier logical network structure. The two-tier structure of some embodiments includes (1) a single logical router (referred to as a provider logical router (PLR) and administrated by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the control plane defines a transit logical switch between the distributed component of the PLR and the service components of the TLR.

For a PLR logical router, some embodiments use active-active mode whenever possible, and only use active-standby mode when stateful services (e.g., NAT, firewall, load balancer, etc.) are configured for the PLR. In active-standby mode, only one of the service routing components is active, i.e., fully operational at a time, and only this active routing component sends out messages to attract traffic. All other service routing components are in standby mode. In some embodiments, the active service component and a standby service component use the same IP address, but different MAC addresses, for communicating with the distributed component. However, only the active component replies to address resolution protocol (ARP) requests from this distributed component. Furthermore, only the active service component advertises routes to the external network to attract traffic.

For a TLR logical router, some embodiments either use no service components or two service components in active-standby mode when stateful services are configured for the TLR. The TLR operates internally in the same manner as a PLR in active-standby mode, i.e., having an active component and a standby component sharing the same network layer address, but only the active component responding to ARP requests. To connect to the PLR, some embodiments assign each of the two service components of the TLR a same network layer address (though different from the IP address used to connect to its own distributed component).

The logical router described above is a distributed logical router implemented by a single distributed routing component and a set of service routing components. Some embodiments provide other types of logical router implementations in a physical network (e.g., a datacenter network) such as a centralized logical router. In a centralized logical router, L3 logical routing functionalities are performed in only gateway machines, and the control plane of some embodiments does not define any distributed routing component and instead only defines multiple service routing components, each of which is implemented in a separate gateway machine.

Different types of logical routers (e.g., distributed logical router, multi-layer logical routers, etc.) with multiple routing components and implementation of the different types of logical routers on edge nodes and managed forwarding elements operating on host machines of a datacenter are described in greater detail in the U.S. patent application Ser. No. 14/814,473, filed Jul. 30, 2015, which is incorporated herein by reference.

The PLR includes service routers 1001-1003 (SR1, SR2, and SR3) that provides access to the physical network and edge services. The PLR also includes a distributed router 1005 (PLR-DR) for routing packets to and from the different tenant logical networks. The PLR distributed router 1005 is connected to the service routers SR1, SR2, and SR3 through a transit logical router (PLR-TLS) 1099.

Each TLR serve as the L3 hub a tenant logical network. Each TLR includes a distributed router (DR) for connecting different L2 segments defined by different logical switches. Specifically, TLR1 includes a TLR1-DR (1015) for connecting logical switches LS-A and LS-B (1011 and 1012), TLR2 includes a TLR2-DR (1025) for connecting logical switches LS-C and LS-D (1021 and 1022), and TLR3 includes a TLR3-DR (1035) for connecting logical switches LS-E and LS-F (1031 and 1032).

In some embodiments, the DP configuration database stores as configuration data the routing tables, the forwarding tables, the rules tables, etc. for the different logical entities. The DP configuration database provides mapping between connections identities (ingress ports and egress ports) and network logical entity identities. The datapath daemon in turn performs the datapath pipeline for different tenants by function calls and following the connection mapping between the different logical entities, where some of the logical entities correspond to various tenant-specific logical network constructs (e.g., TLR-LS or TLR-DR for different tenants). The datapath daemon provides common network services to all tenants by executing pipeline stages that correspond to various provider logical entities (e.g., SRs and PLR-DR).

Figure 11:
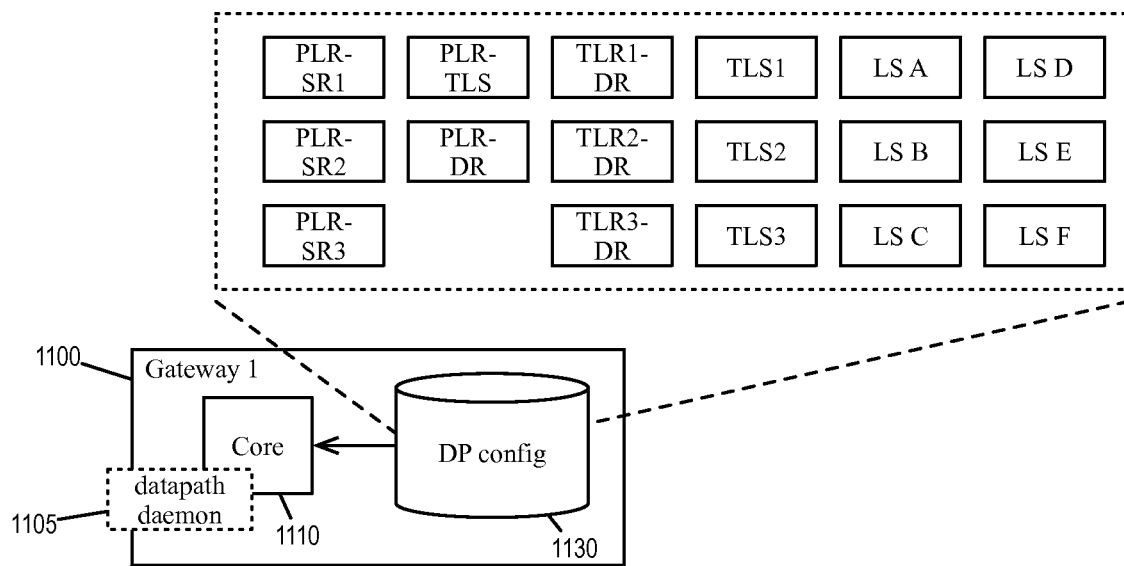
FIG. 11 illustrates a datapath daemon performing gateway packet processing for different tenants at a gateway machine.

FIG. 11 illustrates a datapath daemon 1105 performing gateway packet processing for different tenants at a gateway machine 1100. The datapath daemon 1105 is a processing thread operating on a processor core 1110 of the gateway machine 1100. It is operating off a DP configuration database 1130. The DP configuration database 1130 stores the configuration data (such as routing tables, forwarding tables, and rules tables) for the various logical entities of the data center as shown in the network graph 1000.

Figure 12:
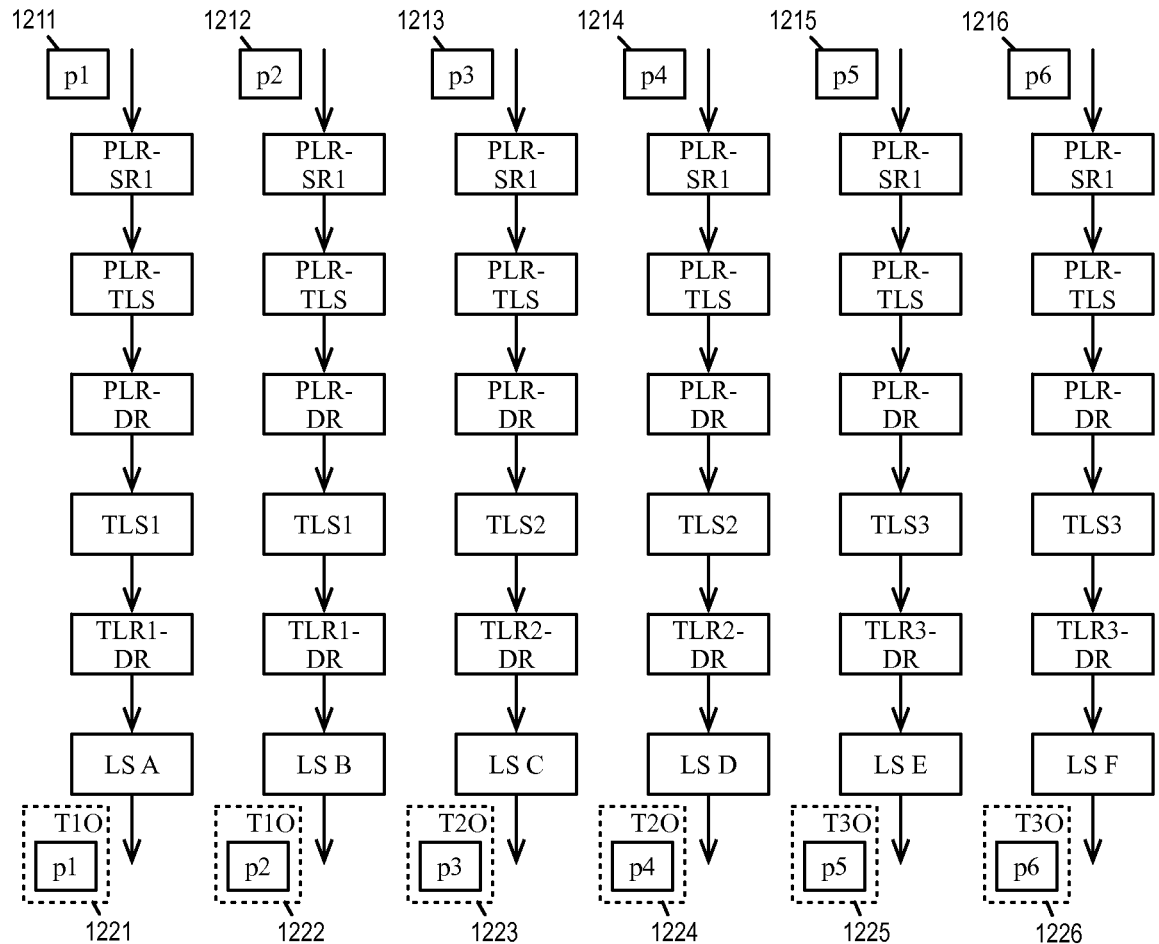
FIG. 12 shows the datapath daemon processing packets by invoking pipeline stages that correspond to the various logical entities.
Figure 12:
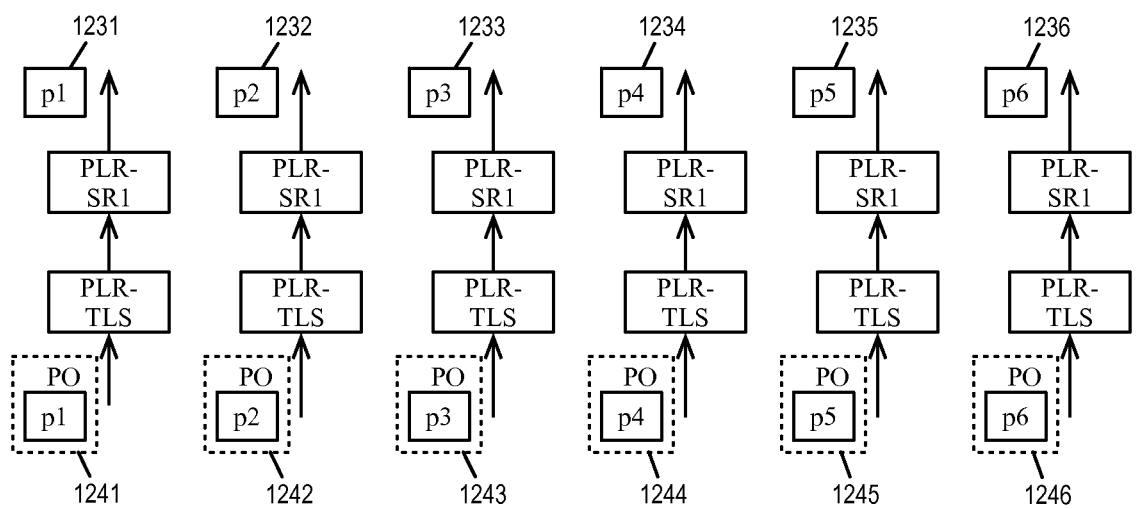

As illustrated, the DP configuration database 1130 includes configuration data for each of the logical entities/entities of the network (logical routers and logical switches 1001-1099), which includes tenant-specific entities (e.g., TLRs) as well as provider entities that are shared by all tenants (e.g., PLR). FIG. 12 shows the datapath daemon 1105 processing packets by invoking pipeline stages that correspond to the various logical entities.

Packets 1211-1216 are southbound packet entering the datacenter from an external network through the uplink of the gateway 1100. The packets 1211-1216 are destined for VMs belonging to different tenants: the packets 1211 and 1212 are destined for a logical network of tenant 1, the packets 1213 and 1214 are destined for a logical network of tenant 2, and the packet 1215 and 1216 are destined for a logical network of tenant 3. As the packet 1211-1216 are from the external network, they are VLAN packets that are not encapsulated.

The packets for different tenants have different destination IP or MAC addresses, and the datapath daemon accordingly identify and execute different pipeline stages (e.g., function calls for different network logical entities) that corresponds to different tenants. The datapath daemon initially invoked PLR stages PLR-SR1, PLR-TLS, PLR-DR, which routed the packet to their corresponding TLSs based on the destination addresses of the packets. These TLSs in turn switched the packets to their corresponding tenant-specific TLRs.

For example, the packet 1211 is a tenant 1 packet destined for a VM behind logical switch LS-A. The datapath daemon 1105 therefore executes pipeline stages that correspond to the following logical entities: PLR-SR1, PLR-TLS, PLR-DR, TLS1, TLR1-DR, and LS-A. The packet 1214 is a tenant 2 packet destined for a VM behind logical switch LS-D. The datapath daemon 1105 accordingly executes pipeline stages PLR-SR1, PLR-TLS, PLR-DR, TLS2, TLR2-DR, and LS-D. The packet 1215 is a tenant 3 packet destined for a VM behind logical switch LS-E. The datapath daemon 1105 accordingly executes pipeline stages PLR-SR1, PLR-TLS, PLR-DR, TLS3, TLR3-DR, and LS-E.

Among these logical entities, PLR-SR1, PLR-TLS, and PLR-DR are provider constructs common to all tenants. TLS1, TLR1-DR, LS-A are tenant-specific constructs for tenant 1. TLS2, TLR2-DR, and LS-D are tenant-specific constructs for tenant 2. TLS3, TLR2-DR, and LS-E are tenant-specific constructs for tenant 3. Each of these stages has corresponding configuration data provided by the DP configuration database for routing packets, identifying next hops, providing services, etc. In some embodiments, tenant-specific logical network constructs use tenant-specific forwarding table, routing table, rules table, and other tenant-specific configuration data.

As the destinations of the packets 1211-1216 are VMs elsewhere in the datacenter, the gateway tunnels these packets to their corresponding destination host machines through encapsulation overlay networks. Specifically, the packet 1211-1216 are encapsulated according to their corresponding tenant logical networks and transmitted as encapsulated packets 1221-1226.

Packets 1231-1236 are northbound packet exiting the datacenter through the gateway 1100 to the external network. These packets 1231-1236 are encapsulated under a provider overlay as they have been routed to the PLR-TLS at their corresponding source host machines. They tunneled to the gateway by the provider overlay encapsulation, and the gateway 1100 invokes PLR-TLS and PLR-SR1 to provide the necessary services before sending them out to the external network through the uplink as VLAN packets.

Though not illustrated, in some embodiments, packets for different tenants are encapsulated differently for different overlay networks, and the datapath daemon uses the tenant-specific information in the encapsulation to identify and execute different pipeline stages that correspond to different tenants.

c. Service-Providing Pipeline Stages

In some embodiments, in addition to executing L3 routing and L2 routing pipeline stages, gateway datapath daemons also execute service providing stages for L4 through L7 processing. These services support end-to-end communication between source and destination applications and are used whenever a message passes from or to a user. The datapath daemon apply these services to packets at the vantage point of the edge gateway without requiring changes to applications running at either the source or the destination of the packets. In some embodiments, the datapath can include service stages for traffic filtering services (such as firewall), address mapping services (such as NAT), encryption and security services (such as IPSec and HTTPS).

In some embodiments, some or all of these service-providing stages are executed when the datapath daemon is executing the service router pipeline stages. Furthermore, in some embodiments, the datapath daemon may execute different service providing pipeline stages for different packets. In some embodiments, the datapath daemon execute different service providing stages based on the L4 flow that the packet belongs to and as well as on the state of the flow. In some embodiments, the datapath daemon executes different service providing stages based on the tenant that the packet belongs to.

Figure 13:
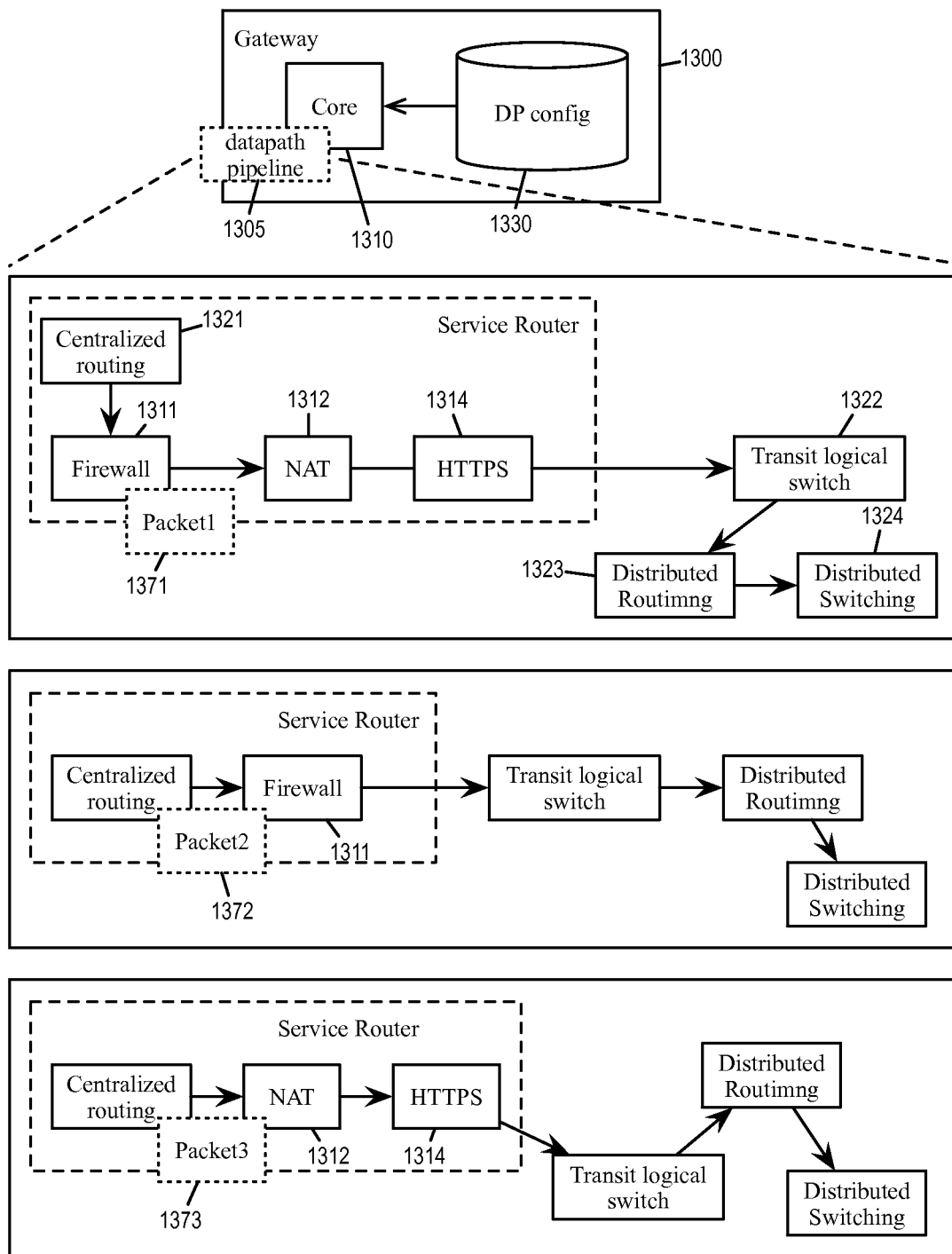
FIG. 13 illustrates a gateway datapath daemon executing service providing pipeline stages for different tenants.

FIG. 13 illustrates a gateway datapath daemon executing service providing pipeline stages for different tenants. The datapath daemon 1305 is a processing thread operating on a processor core 1310 of the gateway machine 1300. It is operating off a DP configuration database 1330, which provides configuration data and connection mapping for various datapath pipeline stages. Some of these pipeline stages are service-providing stages for services such as firewall, NAT, and HTTPS. The datapath daemon decides which service stages to perform according to the configuration data of the logical router, the result of L3 routing, and/or the content of the packet, which may indicate which L4 flow and/or which tenant that the packet belongs.

The datapath daemon performs these service providing stages after centralized routing (1321) and before transit logic switch (1322), distributed router (1323), and logical switch (1324) stages of the pipeline. In some embodiments, these service-providing stages are considered part of service router (SR) pipeline stage. Some of the service-providing stages are for providing stateful services and are therefore centralized or concentrated logical entities operating at one gateway machine in some embodiments. In some embodiments, a L4 service stage provide stateful service by maintaining a state for each L4 connection.

The figure illustrates the data daemon 1305 executing different service providing stages for different packets 1371-1373. These packets may belong to different tenants or different L4 flows, or belong to a same L4 flow at different state. As illustrated, when processing the packet 1371, the datapath daemon executes service stages 1311, 1312, and 1314, which respectively provides firewall, NAT, IPSec, and HTTPS services. When processing the packet 1372, the datapath daemon executes only the firewall service stage (1311). When processing the packet 1373, the datapath executes NAT and HTTPS service stages (1312 and 1314).

Figure 14:
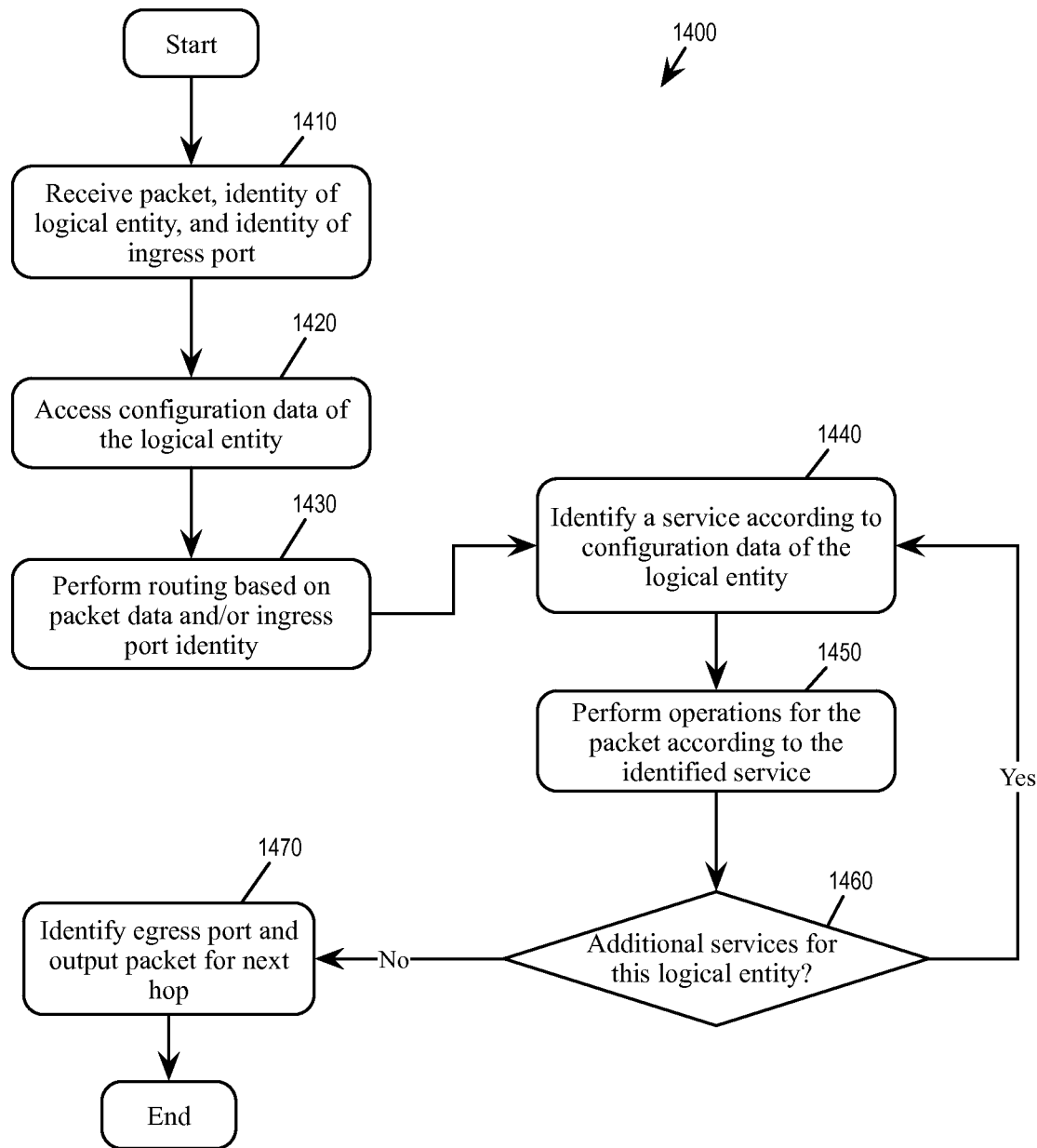
FIG. 14 conceptually illustrates a process for providing services within a logical router.

FIG. 14 conceptually illustrates a process 1400 for providing services within a logical router (e.g., a service router). In some embodiments, that core performing the datapath daemon performs the process 1400 when it performs a function call for a pipeline stage that correspond to a service router. The process starts when it receives (at 1400) a packet and an identity of a logical port as ingress port. As discussed above by reference to FIGS. 5 and 6, in some embodiments, the DP configuration database provides the necessary mapping that allows the datapath daemon to identify a corresponding logical entity when presented with the identity of a logical port. The process then accesses (at 1420) the configuration data for the identified logical entity. As mentioned, the configuration data of a logical entity such as a service router can include its routing table as well as specifications for services that are to be provided. By the service router.

The process then performs (at 1430) routing on the packet (as this is a service router stage). Such routing in some embodiments is based on the source or destination address of the packet, or identity of the ingress port. The process then identifies (at 1440) a network service according to the configuration data of the logical entity. In some embodiments, service routers may belong to different tenant logical networks, which may have different policies and require different services. Consequently, the DP configuration database would specify different services for different tenant logical routers, and the service routers of those different tenant logical routers would perform different services.

The process then performs (at 1450) the operations as specified by the identified service (e.g., NAT, firewall, HTTPS, etc.) In some embodiments, these operations are also based on the current content of the packet (e.g., destination IP address), which may have been altered by a previous service performed by the process.

At 1460, the process determines whether the DP configuration database specifies another service for this service router. If so, the process returns to 1440 to perform another service. Otherwise the process proceeds to 1470 to identify the egress port and to output the packet for the next hop. The process 1400 then ends.

II. Caching for Datapath Pipeline

Rather than performing the pipeline stages for all packets, the gateway in some embodiments caches the result of the previous packet operations and reapplies the result to subsequent packets that meet certain criteria, i.e., cache hit. For packets that do not have applicable or valid result from previous packet processing operations, i.e., cache miss, the gateway datapath daemon executes the pipelined packet processing stages. In some embodiments, when the datapath daemon executes the pipelined stages to process a packet, it records a set of data from each stage of the pipeline and synthesizes those data into a cache entry for subsequent packets.

In some embodiments, each cache entry corresponds to a L4 flow/connection (e.g., having the same five-tuple of source IP, destination IP, source port, destination port, and transport protocol). In other words, the datapath daemon determines whether a packet has an applicable cache entry by identifying the flow the packet. Consequently, in some of these embodiments, the datapath cache is also referred to as a flow cache.

Figure 15A:
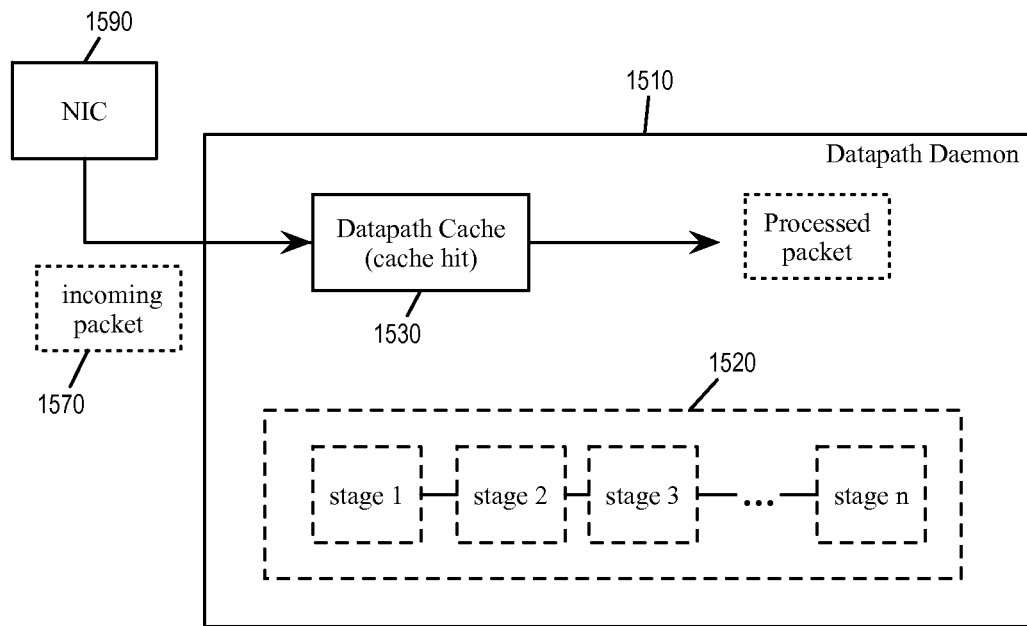
FIGS. 15a-b illustrates a datapath daemon that maintains a cache to accelerate packet processing.
Figure 15B:
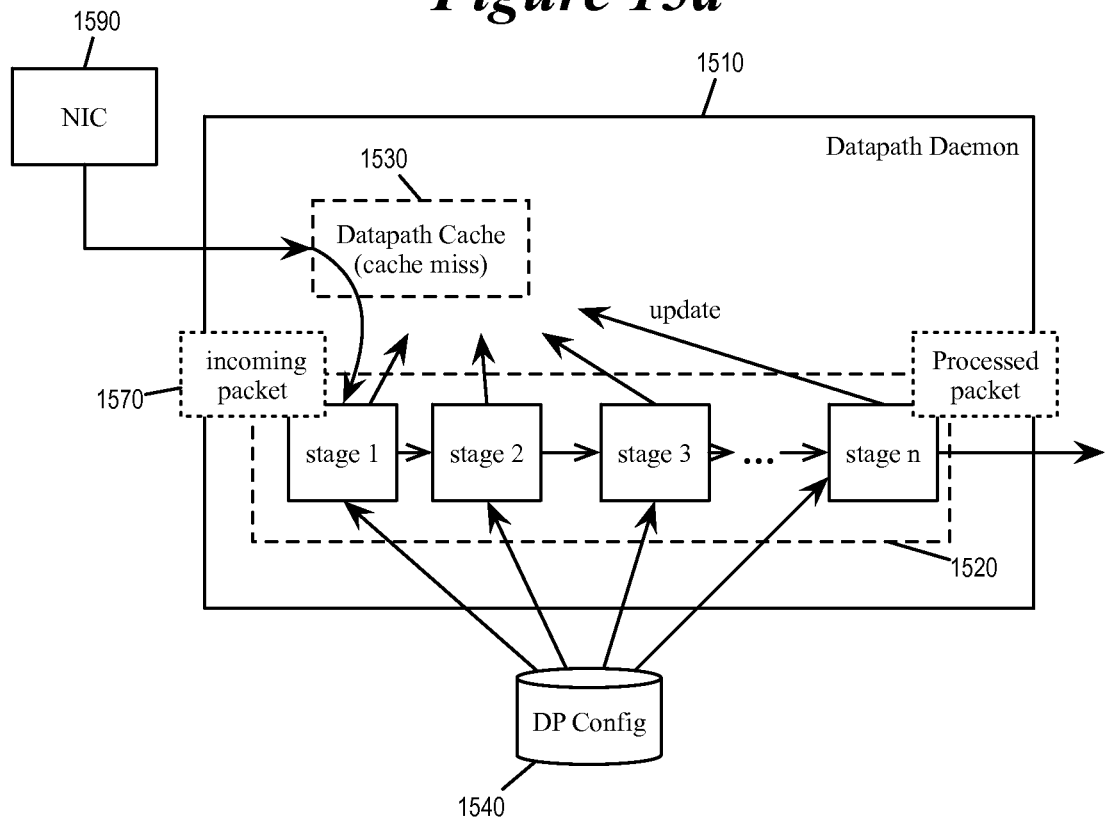

FIGS. 15a-b illustrates a datapath daemon that maintains a cache to accelerate packet processing. As illustrated, a datapath daemon 1510 running on a core of a processor is processing a packet 1570 from a NIC 1590. The datapath daemon 1510 is a processor thread that can process the packet 1570 either by executing the stages of a datapath pipeline 1520 as described in Section I or by applying an entry from a datapath cache 1530. The datapath daemon uses the configuration data stored in a datapath configuration database 1540 to configure and perform its pipelined stages.

FIG. 15a illustrates packet processing when the incoming packet 1570 is a cache hit. As illustrated, the datapath daemon is able to find a valid matching entry in the datapath cache 1530 for the incoming packet 1570 (e.g., having the same flow identifiers). The daemon 1510 in turn uses the matching entry in the cache to directly specify the actions that should be taken with regard to packet, e.g., specifying the packet's next hop, resolving an IP address, reject the packet, translate an IP address in the packet header, encrypt/decrypt the packet, etc. None of the pipeline stages is executed (i.e., the datapath daemon does not execute any of the pipeline stages).

FIG. 15*b* illustrates packet processing when the incoming packet 1570 is a cache miss. As illustrated, the packet 1570 does not have a valid matching entry in the datapath cache 1530 for the packet 1570. The datapath daemon 1510 therefore executes the stages of the datapath pipeline (i.e., by performing function calls and applying the configuration data for logical entities as described in Section I above). As the datapath executes the stages of the datapath pipeline, each stage of the datapath pipeline produces a set of information for synthesizing a cache entry in the datapath cache. This new cache entry (or updated cache entry) will be applicable to subsequent packets that belong to a same class of packet as the packet 1570 (e.g., belonging to the same L4 flow).

Figure 16:
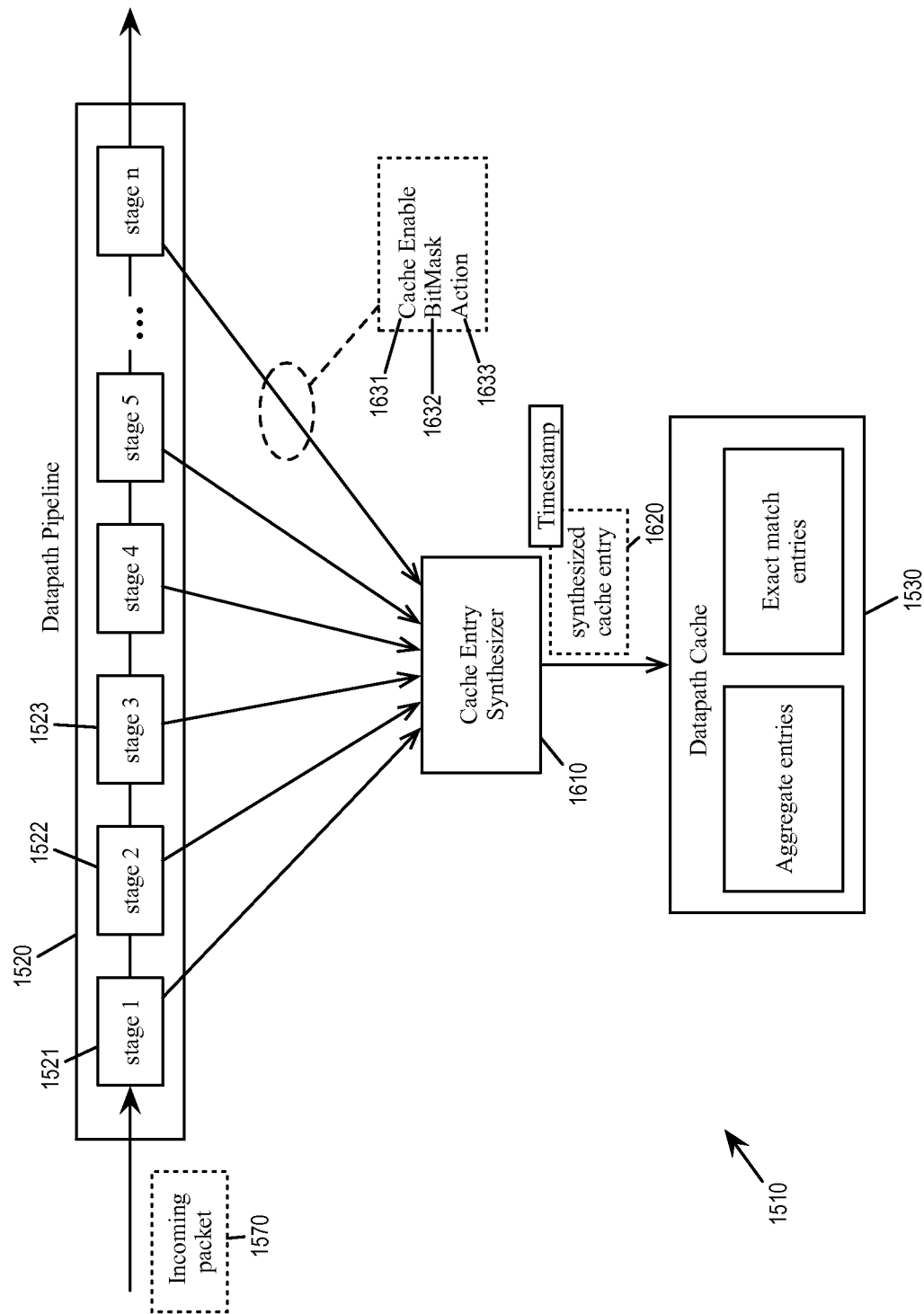
FIG. 16 illustrates the synthesis of a cache entry for the datapath cache.

FIG. 16 illustrates the synthesis of a cache entry for the datapath cache. As illustrated, the packet 1570 has resulted in the cache miss and the datapath daemon 1510 is executing the stages of the datapath pipeline 1520. As the datapath pipeline is being executed, some or all of the executed stages issue data or instructions that will be used by a synthesizer 1610 to synthesize a cache entry 1620. In some embodiments, the cache entry synthesis instructions or data issued by a pipeline stage include the following: a cache enable field 1631, a bitmask field 1632, and an actions field 1633.

The cache enable field 1631 specifies whether to create a cache entry. In some embodiments, a pipeline stage may determine that the result of the packet processing should not be used as a cache entry for future packets, i.e., only the packet 1570 should be process this way and future packets should not re-use the processing result of the packet 1570. In some embodiments, one pipeline stage specifying that a cache entry should not be created would prevent the synthesizer 1610 from creating the cache entry, even if all other pipeline stages indicates that it is OK enables the creation of the cache entry.

The bitmask field 1632 defines which part of a packet header the pipeline stage actually uses for determining the action to take with regard to the packet. Some embodiments only apply bitmask to fields in the inner header (IP header and MAC header) but not the outer header (i.e., the header of the overlay encapsulation such as VXLAN). In some embodiments in which cache entries are flow-based, the bitmask field 1632 is used to create cache entries that are applicable to multiple flows, i.e., by making certain bit fields in the inner header as "don't cares".

The action field 1633 specifies what action that the pipeline stage had taken with regard to the packet.

The synthesizer 1620 gathers all cache entry synthesis instructions from all pipeline stages and synthesizes an entry 1620 in the flow cache from all received instructions (unless one or more pipeline stages specifies that a cache entry should not be generated). The synthesized cache entry specifies the final action for packets meeting certain criteria (i.e., belonging to certain L4 flows). When generating the cache entry 1620, the synthesizer in some embodiments also includes a timestamp specifying the time that the cache entry is created. This timestamp will be used to determine whether the cache entry is valid for subsequent packets.

In some embodiments, the synthesizer 1610 creates aggregate cache entries that are applicable to multiple L4 flows, or "mega-flows". In some embodiments, these are entries whose matching criteria have certain bits or fields that are masked (i.e., regarded as "don't cares"). In some embodiments, the synthesizer creates a mega-flow entry based on the bitmask fields 1633 received from executed pipeline stages. The synthesizer 1610 also creates exact match entries whose matching criteria are fully specified to be applicable to only one flow, or "microflow".

Figure 17:
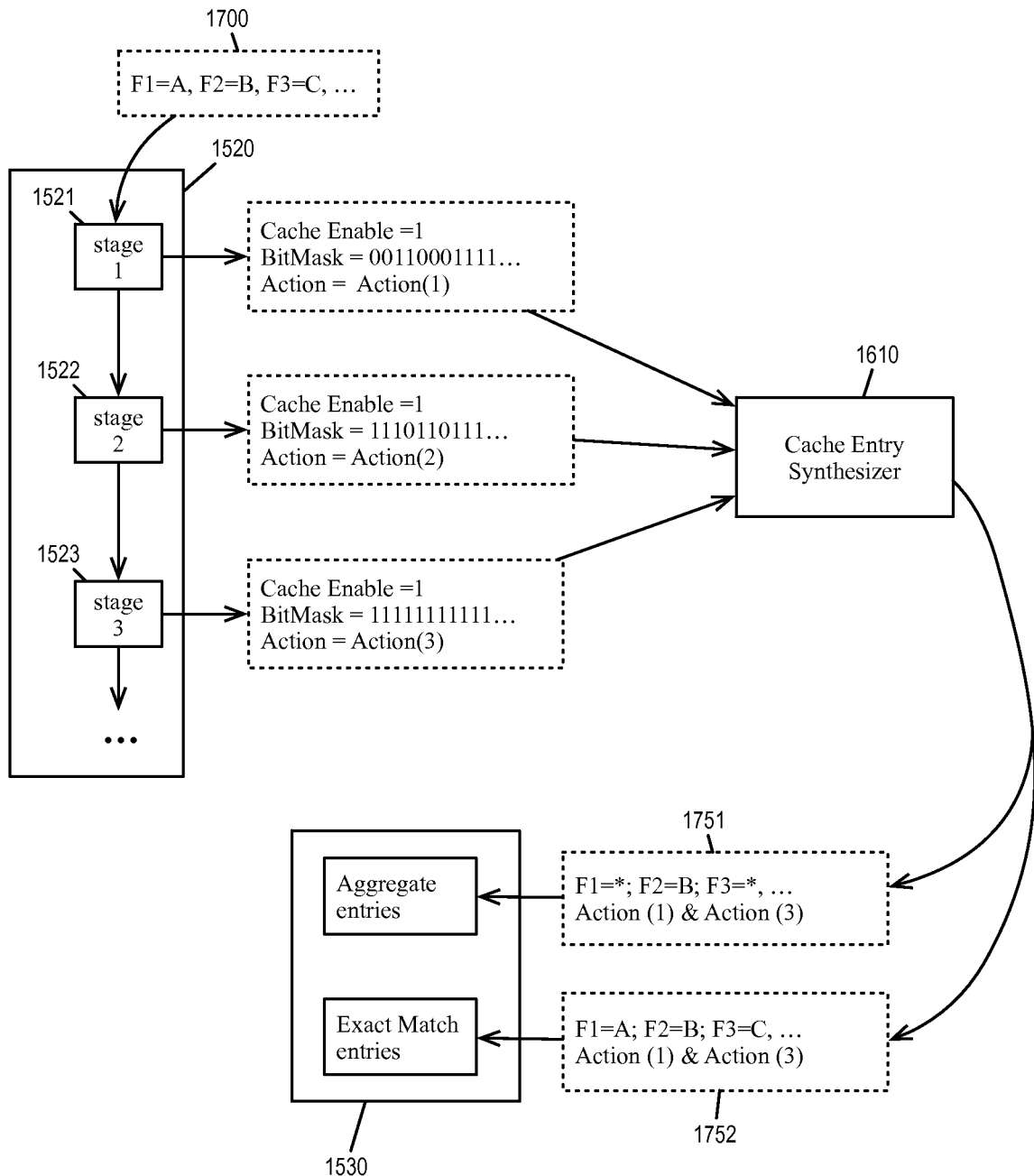
FIG. 17 illustrates an example synthesis of aggregate cache entries and exact match cache entries.

FIG. 17 illustrates an example synthesis of aggregate cache entries and exact match cache entries. The datapath 1520 processes a packet 1700 through its stages 1521-1523, and each stage produces a set of cache synthesis instructions for the cache entry synthesizer 1610. The cache entry synthesizer 1610 in turn creates an aggregate cache entry 1751 and an exact match cache entry 1752 for the datapath cache 1530.

As illustrated, the exact match entry 1752 fully specifies all fields as its matching criteria. These fields match exactly that of the packet 1700 (e.g., its 5-tuple flow identifiers in the header). On the other hand, the aggregate entry 1751 only specifies some of its fields in its matching criteria while masking some other fields. The packet 1700 would match these matching criteria, but so would other packets that may have different values in those corresponding fields. In some embodiments, which fields/bits are masked in the matching criteria of aggregate entries are determined by the bitmasks fields (e.g., 1632) produced by individual datapath stages.

Each cache entry also specifies the final actions that are to be taken with regard to each packet that match the cache entry. In some embodiments, these actions include all actions that affect the packet as it is output. In the example of FIG. 17, stage 1521, 1522, and 1523 respectively specify action (1), action (2), and action (3). Actions (1) and (3) affect the packet, but not Action (2), so only Actions (1) and (3) become part of the synthesized cache entries 1751 and 1752. For instance, actions that update registers to indicate the packet processing stage do not affect the output packet and thus are not included in the cached flow entry, whereas actions that modify header values (e.g., modifying the MAC addresses as part of a L3 routing operation) are included. If a first action modifies a MAC address from a first value to a second value, and a subsequent action modifies the MAC address from the second value to a third value, some embodiments specify to modify the MAC address directly to the third value in the cached flow entry.

Figure 18:
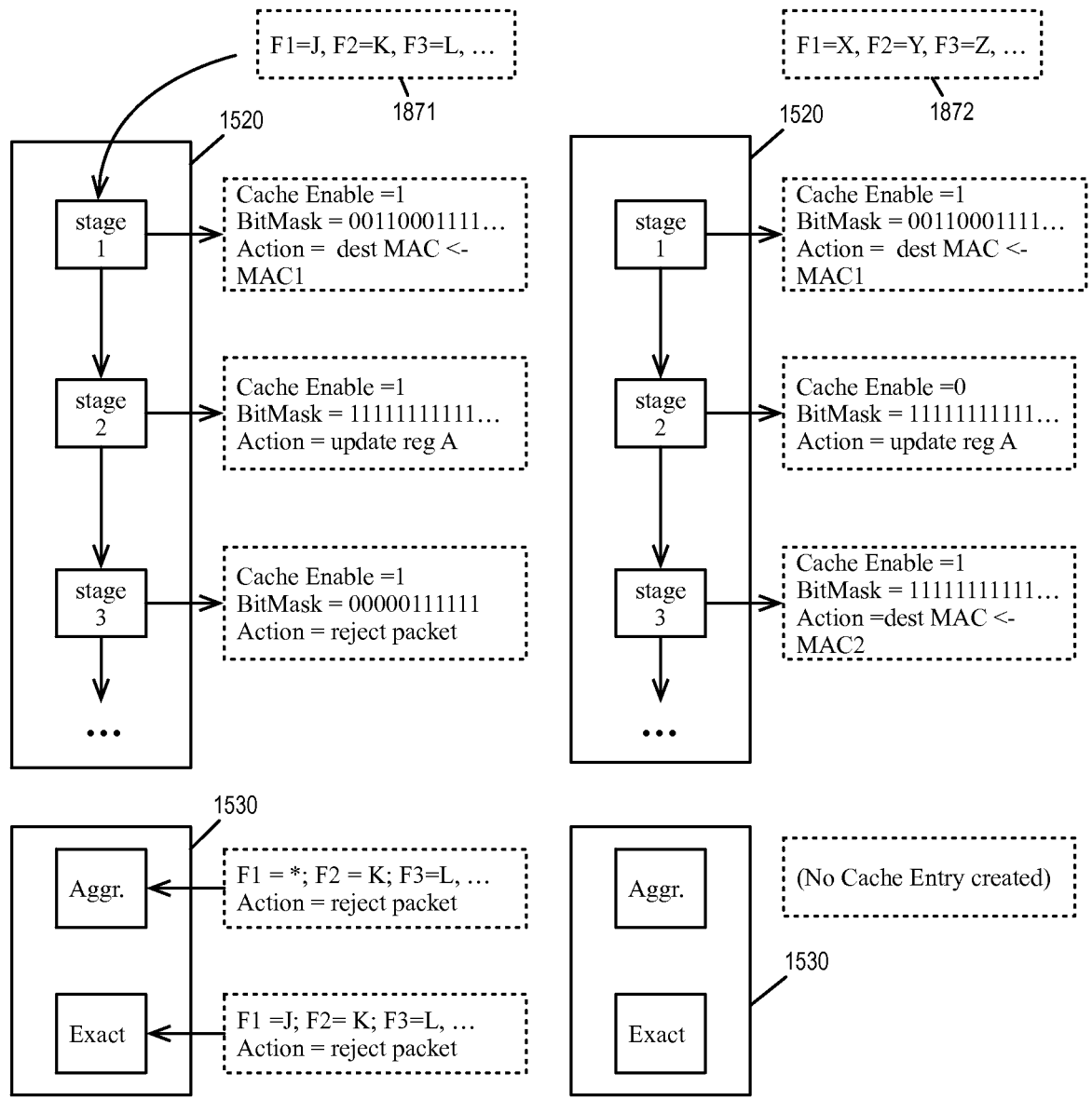
FIG. 18 illustrates examples of datapath stages specifying actions to override all other actions.

In some embodiments, the action specified by one stage would override all other stages. FIG. 18 illustrates examples of datapath stages specifying actions to override all other actions. The figure illustrates two example packets 1871 and 1872 being processed by the datapath 1520.

As illustrated, as the datapath 1520 processes the packets 1871 and 1872, each of its stages specifies certain actions. For the packet 1871, the action specified includes "reject packet" by the stage 1523. This action would override all other actions, and the cache entries created by this packet 1871 would only perform the action "reject packet". For the packet 1872, the stage 1522 specifies to disable caching (cache enable=0). As mentioned, in some embodiments, each stage of the datapath can specify to not create a cache entry for a given packet (e.g. by its cache enable bit), regardless what other stages in the datapath has specified. Consequently, the cache entry synthesizer 1610 (not shown) does not create a cache entry for the packet 1872.

Figure 19:
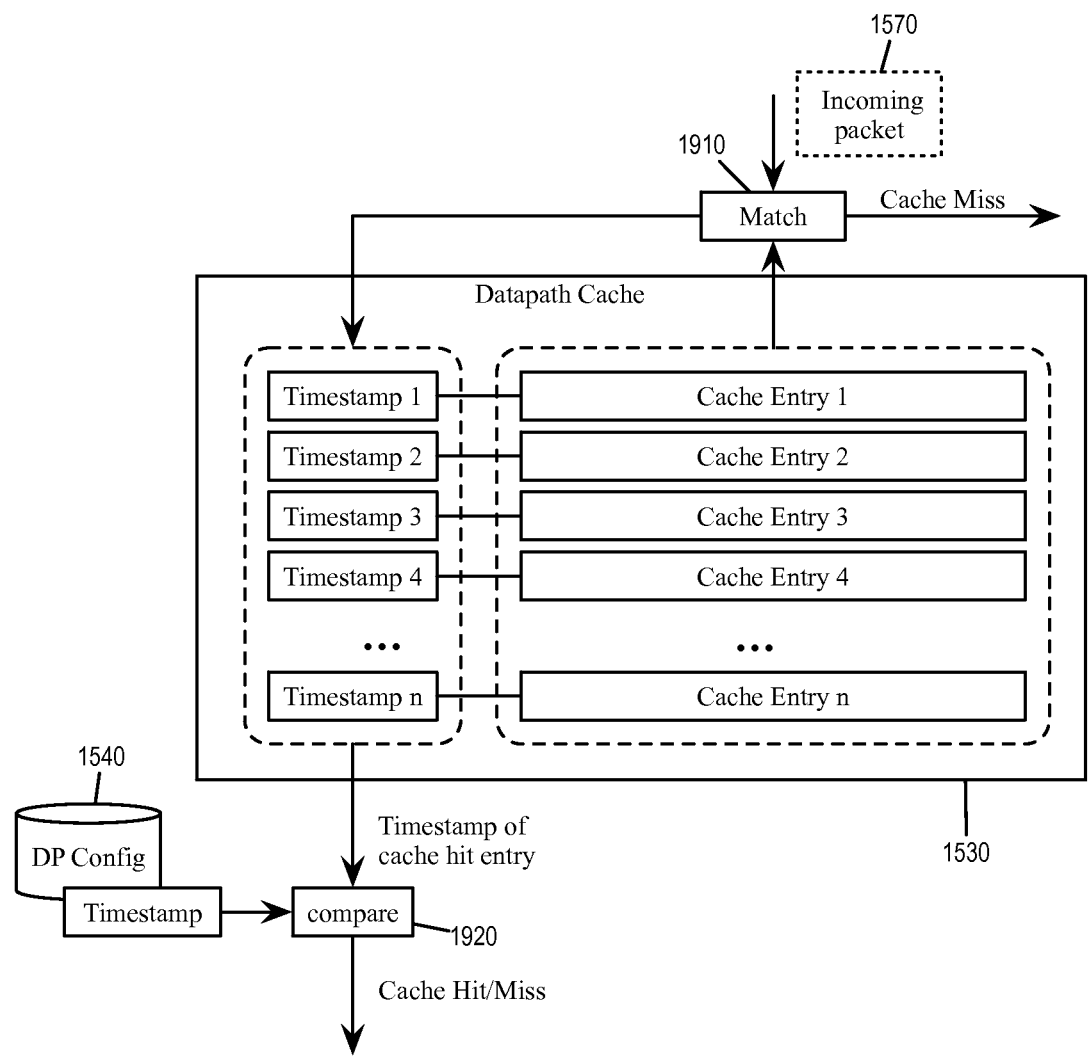
FIG. 19 illustrates examining the entries of the datapath cache to determine whether there is a cache miss or a cache hit.

FIG. 19 illustrates examining the entries of the datapath cache to determine whether there is a cache miss or a cache hit. As illustrated, the datapath daemon compares (at a matching function 1910) the certain fields of the packet 1570 (e.g., the flow identifying fields) against entries in the cache 1530 to look for cache entries that are applicable to the packet 1570. If the matching function 1910 is not able to find a matching cache entry, the datapath daemon would proceeds as a cache miss.

As illustrated, each entry is also associated with a timestamp, marking the time when the cache entry was created and stored into the data cache (by the synthesizer 1610). Some embodiments compare (by a compare function 1920) the timestamp of the matching cache entry with a timestamp of the DP configuration database 1540 in order to determine whether the cache entry is still valid. (In some embodiments, this timestamp records the time when data in the database is last updated by the network controller or manager. The updating of the DP configuration database will be described in Section III below.) Specifically, if the DP configuration database 1540 has not been altered since creation of the cache entry, i.e., the timestamp of the DP configuration database is before the timestamp of the matching entry, the cache entry is still valid and the datapath daemon would proceed as a cache hit. Conversely, if the DP configuration database 1540 has been altered since the creation of the cache entry, i.e., the timestamp of the DP configuration database is after the timestamp of the matching entry, then the cache entry is treated as no longer valid and the datapath daemon would proceed as a cache miss.

Figure 20:
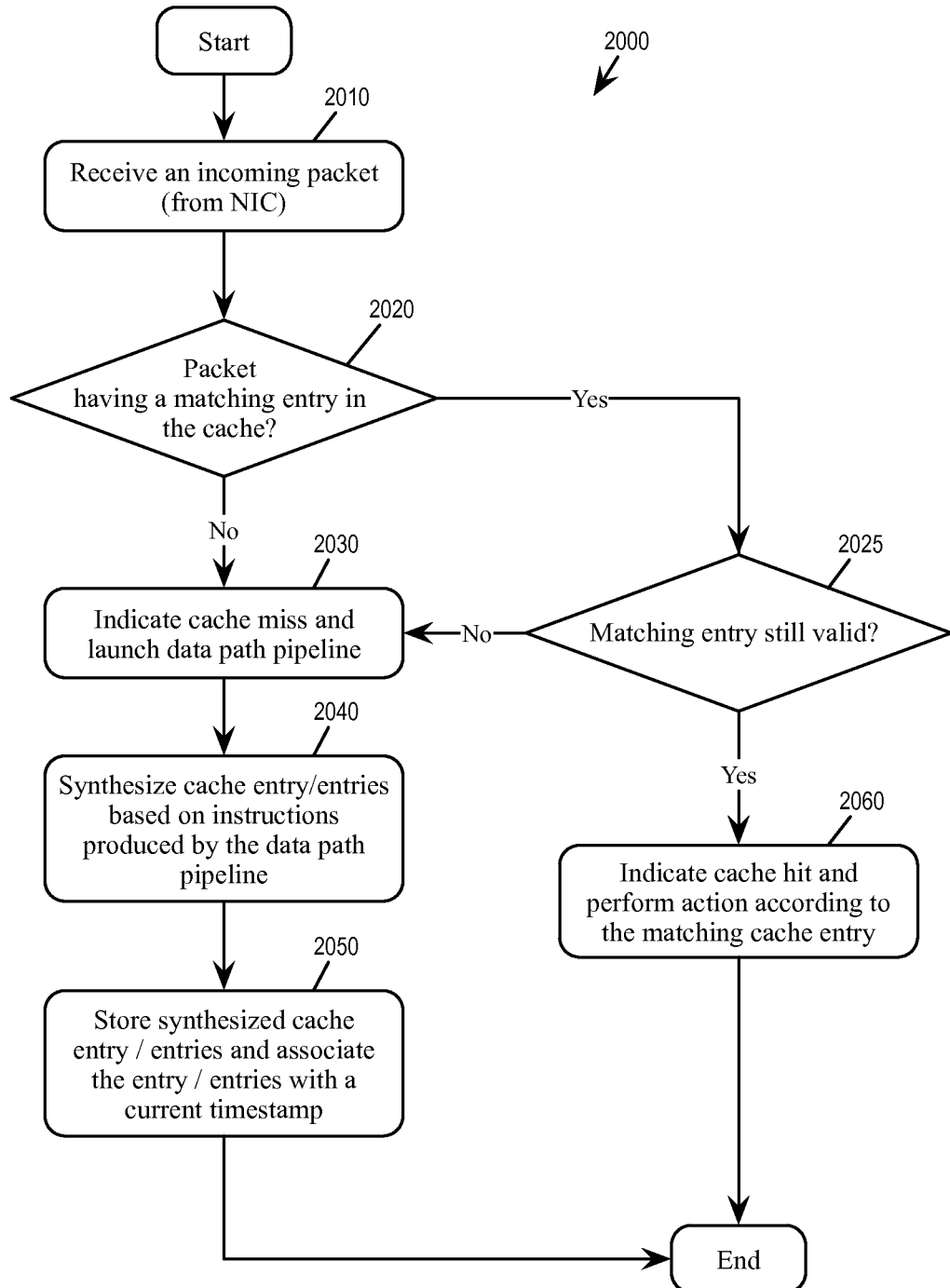
FIG. 20 conceptually illustrates a process for operating a datapath cache.

FIG. 20 conceptually illustrates a process 2000 for operating a datapath cache. In some embodiments, a processor core operating a thread as datapath daemon performs the process 2000. The process 2000 starts when it receives (at 2010) a packet from either the external physical network or from the datacenter. The process then determines (at 2020) whether the packet has a matching entry in the datapath cache. If so, the process proceeds to 2025. If the packet has no matching entry in the datapath cache, the process proceeds to 2030.

At 2025, the process determines if the matching cache entry is still valid, e.g., if its timestamp indicate that the cache entry is made after the most recent update to the DP configuration database. The determination of cache entry validity is described by reference to FIG. 19 above. If the matching cache entry is valid, the process proceeds to 2060. Otherwise, the process proceeds to 2030.

At 2030, the process indicates that the packet has resulted in a cache miss and launches the datapath pipeline by executing its stages. The process then synthesizes (at 2040) a cache entry based on the data or instructions produced by the stages of the datapath pipeline. The synthesis of cache entries is described by reference to FIG. 16 above. The process then stores (at 2050) synthesized cache entry and associate the entry with a current timestamp. The process 2000 then ends.

At 2060, the process indicates cache hit and performs action according to the matching cache entry. The process 2000 then ends.

III. Datapath Configuration Update

As mentioned, the pipeline stages of the datapath daemon use the configuration data in the DP configuration database as forwarding tables, routing tables, rules tables, etc. As these tables contain real time information on what actions should be taken regarding packets at the gateway, some embodiments dynamically make updates to the DP configuration database even while the datapath daemon is actively accessing it. To ensure that the datapath daemon does not use incomplete (and therefore corrupted) configuration data for its pipeline stages while the DP configuration database is being updated, some embodiments maintain two copies of the DP configuration database. One copy of the database is used as staging area for new updates from the network controller/manager such that the datapath daemon can safely use the other copy of the database. Once the update is complete, the roles of the two database copies are reversed in an atomic fashion. In some embodiments, the network controller waits for the datapath daemon to complete its current run-to-completion packet processing pipeline stages before switching over.

Figure 21:
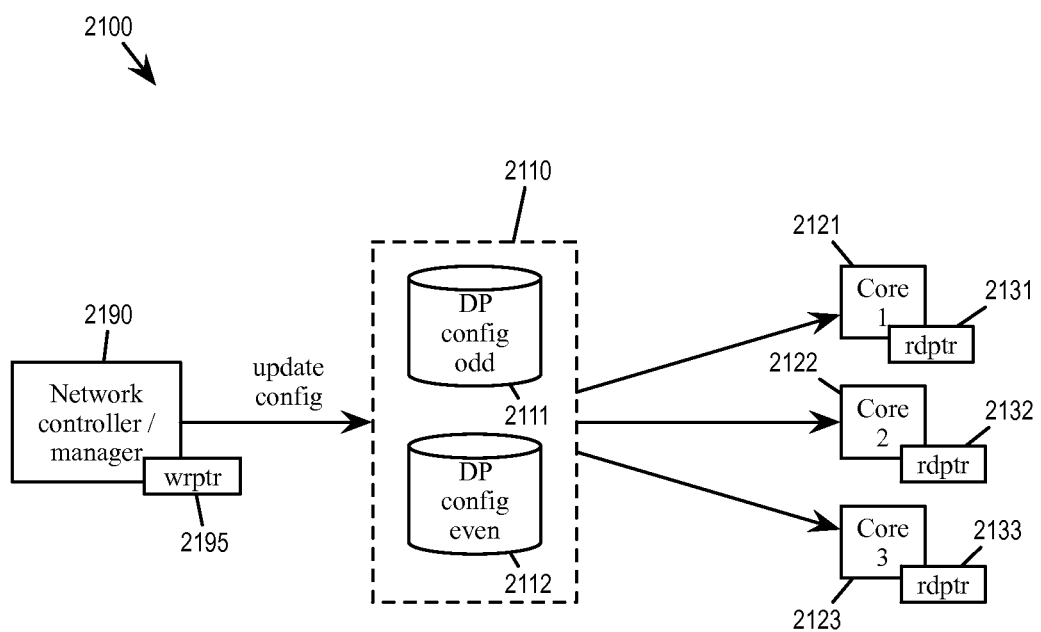
FIG. 21 illustrates a gateway having a DP configuration database that supports updating in atomic fashion.

FIG. 21 illustrates a gateway 2100 having a DP configuration database 2110 that supports updating in atomic fashion. As illustrated, the gateway 2100 has a set of processor cores 2121-2123, each core is operating a datapath daemon that uses the configuration data in DP configuration database 2110 to execute pipeline stages that correspond to logical entities. A network controller/manager 2190 dynamically updates the configuration data stored within the DP configuration database while the cores are actively using the database.

As illustrated, the DP configuration database 2110 has two copies: an odd copy 2111 and an even copy 2112 ("DP config odd" and "DP config even"). Each copy of the database stores the complete configuration data for operating the datapath daemon at the cores 2121-2123. In some embodiments, the two different copies are stored in two different physical storages. In some embodiments, the two copies are stored in different places of a same storage.

The network controller 2190 uses a write pointer 2195 to select either the odd copy or the even copy to write into when making update to the DP configuration database 2110. The cores 2121-2123 respectively use read pointers 2131-2133 to select either the odd copy or the even copy to read from when executing pipeline stages. The network controller 2190 selects and updates one copy of the DP configuration database while the cores 2121-2123 each selects and uses the other copy of the DP configuration database.

Figure 22A:
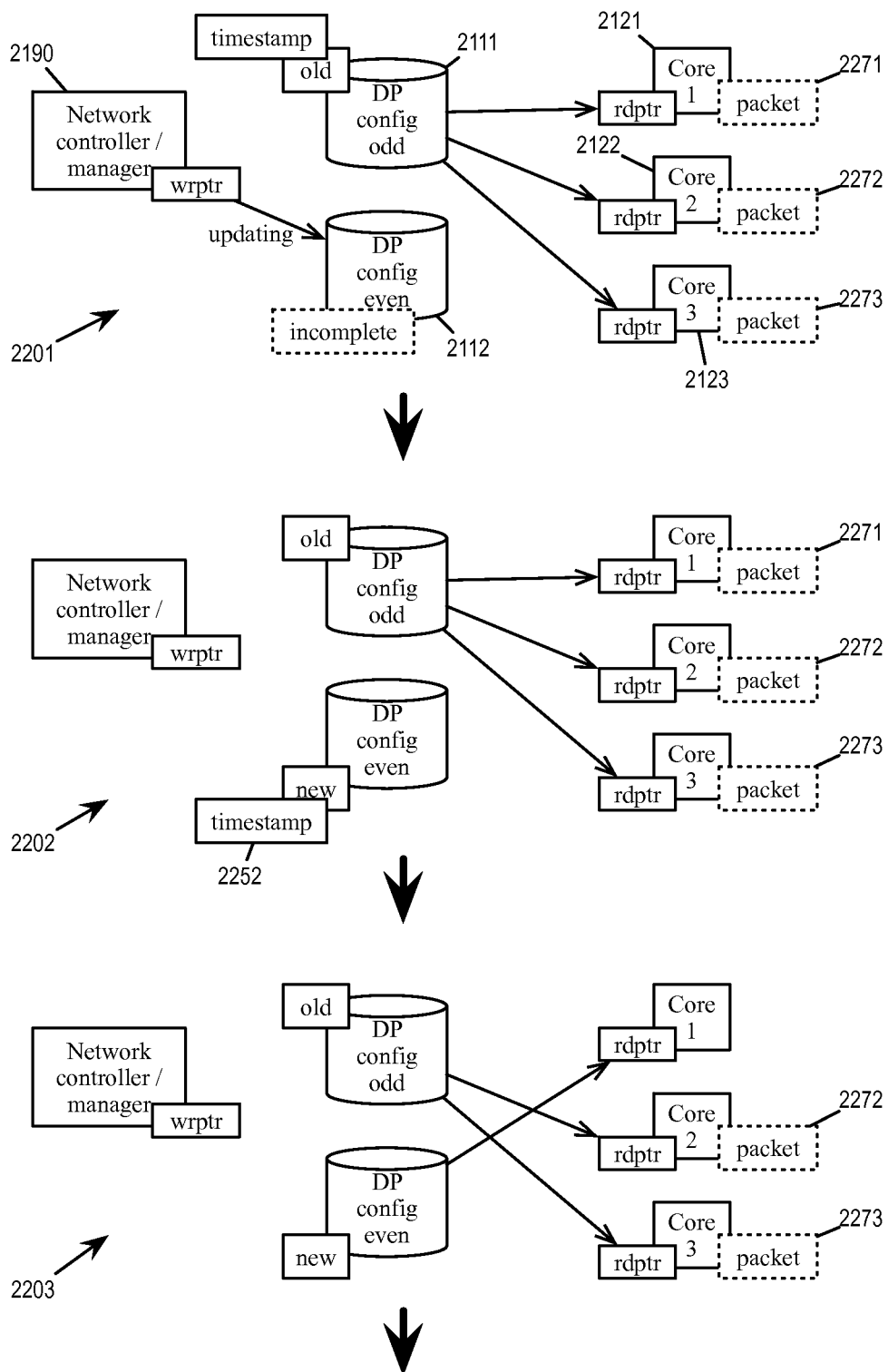
FIGS. 22a-b illustrates the atomic updating of the datapath configuration database 2110.
Figure 22B:
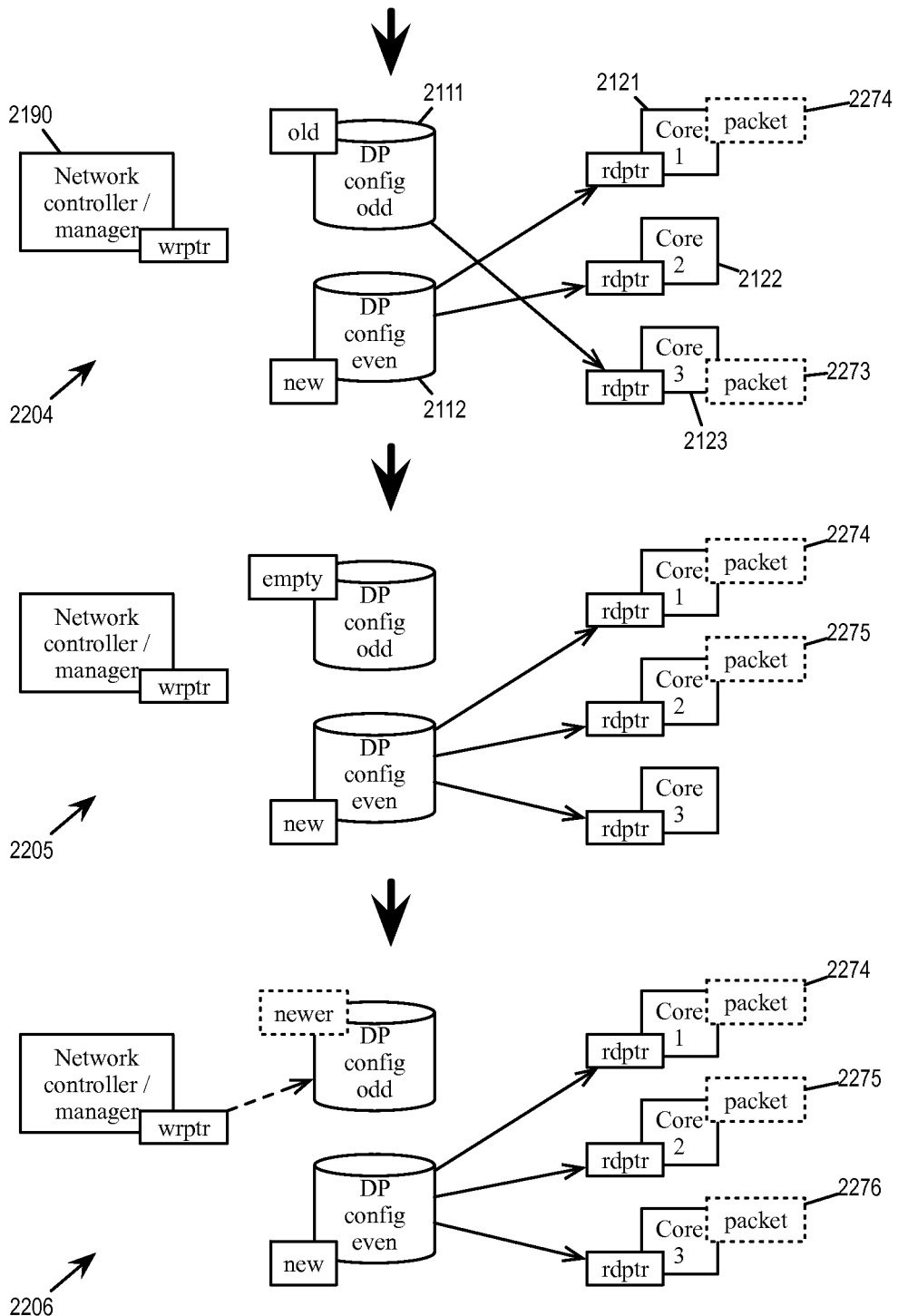

FIGS. 22a-b illustrates the atomic updating of the datapath configuration database 2110. The figure illustrates the update process in six stages 2201-2206.

At the first stage 2201, all of the read pointers 2131-2133 are pointing at the odd copy 2111, and the write pointer 2195 is pointing at the even copy 2112. Furthermore, all of the cores 2121-2123 are reading the configuration data from the odd copy 2111 and executing packet processing pipelines for processing packets 2271-2273, respectively. The network controller 2190 is writing into the even copy 2112. The data in the even copy 2112 is therefore incomplete or corrupted, but the datapath daemons in cores 2121 and 2123 are insulated from this as they are operating off the odd copy 2111.

At the second stage 2202, the network controller has finished updating the DP configuration database, i.e., it has completed writing into the even copy 2112. This updated database is associated with a timestamp 2252 (for determining cache entry validity as described in Section II above). In the meantime all of the cores are still in the middle of their respective run-to-completion pipeline.

At the third stage 2203, the core 2121 has completed its previous run-to-completion pipeline for the packet 2271. The read pointer 2131 then switches over to the even copy 2112 before the core 2121 starts processing another packet. In other words, the datapath daemon of the core 2121 will be using the updated configuration data for its next packet.

The other two cores 2122 and 2123 are still in their current run-to-completion pipeline by using the odd copy of the database.

At the fourth stage 2204, the core 2122 has also completed its packet-processing pipeline for the packet 2272 and its corresponding read pointer has switched over to the even copy 2112. The core 2121 in the meantime has started processing another packet 2274 by using the updated new data in the even copy 2112. The core 2123 is still processing packet 2273 by using the old configuration at the odd copy 2111.

At the fifth stage 2205, the core 2123 has also completed its packet-processing pipeline for the packet 2273 and its corresponding read pointer 2133 has switched over to the even copy 2112. The core 2122 has started processing a packet 2275. At this moment, none of the datapath daemons are using the old configuration data in the odd copy 2111 for processing packet. Since there is already a new, more updated version of the DP configuration database in the even copy 2112, the old data in the odd copy 2111 is no longer useful. Some embodiments therefore reset the odd copy 2111 of the DP configuration database to indicate that the data in it is no longer valid, and that the network controller is free to write new configuration data into it.

At the sixth stage, the write pointer 2195 has switched over to the odd copy of the database while the cores 2121-2123 are using the configuration data stored in the even copy 2112 to process packets 2274-2276. This allows updates to the DP configuration database to take place without affecting the operations of any of the datapath daemons.

Figure 23:
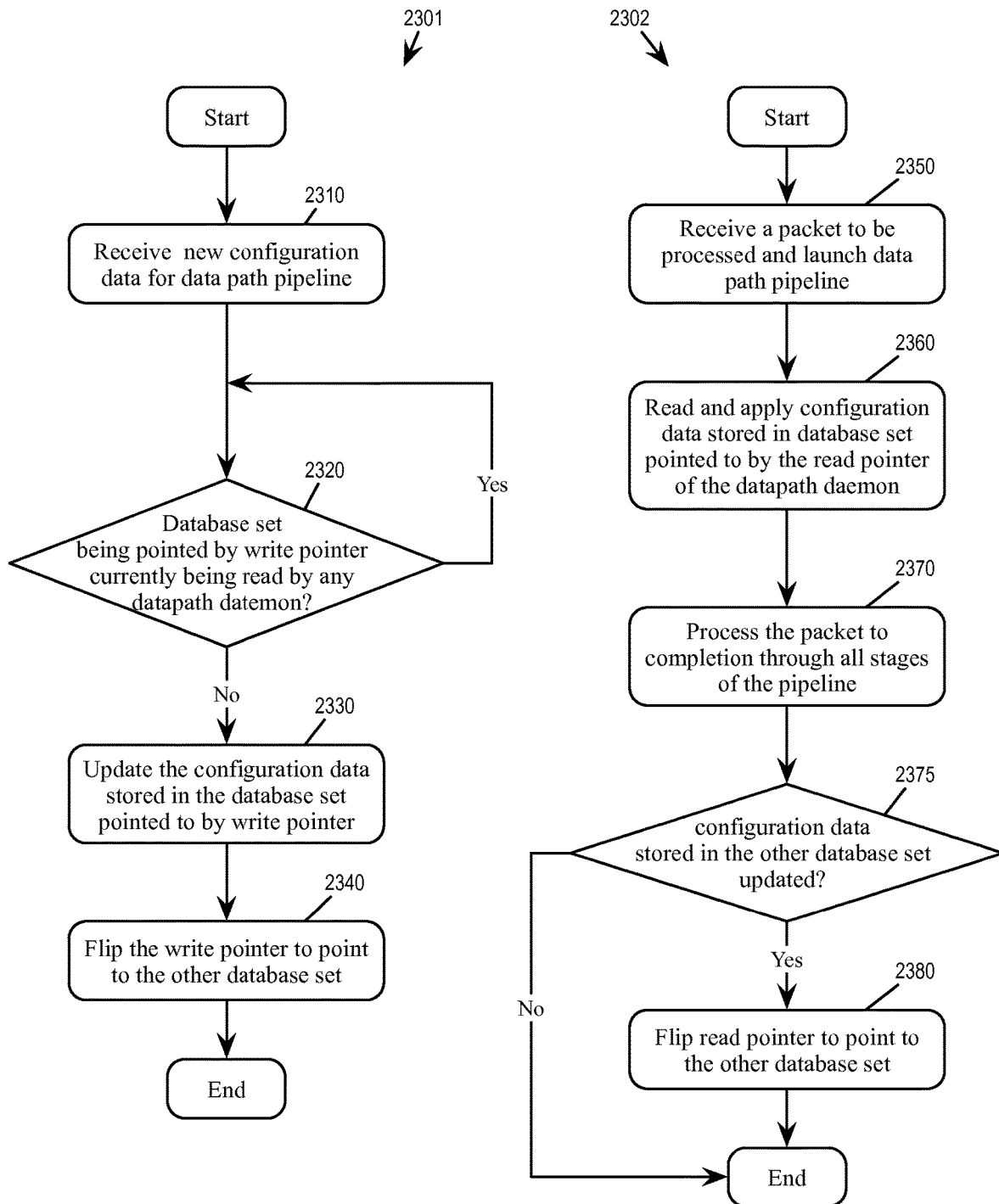
FIG. 23 conceptually illustrates processes controlling the read and write pointers of the DP configuration database.

FIG. 23 conceptually illustrates processes 2301 and 2302 controlling the read and write pointers of the DP configuration database. In some embodiments, the gateway machine performs both the processes 2301 and 2302.

The process 2301 is for controlling the write pointer for writing into the DP configuration database by a network controller. The process 2301 starts when the gateway machine receives (at 2310) update data for the DP configuration database from the network controller/manager. The process then determines (at 2320) whether the copy of the database being pointed to by the write pointer is currently being read by any cores running datapath daemons. If so, the process returns to 2320 to wait until the copy of the database is no longer being used by an of the datapath daemons. Otherwise the process proceeds to 2330. Some embodiments make this determination by examining the read pointers used by datapath daemons: when none of the read pointers are currently pointing at the copy of the database that is being pointed to by the write pointer, the copy of the database being pointed to by the write pointer is not being used (so safe to write into).

At 2330, the process updates (at 2330) the configuration data (e.g., by adding, deleting, modifying table entries, etc.) stored in the copy of the database pointed to by the write pointer. Once the update is complete, the process flips (at 2340) the write pointer to point to the other copy of the database (if odd then even and vice versa). The process 2301 then ends.

The process 2302 is for controlling the read pointer used by a core/datapath daemon for reading from the DP configuration database. The process 2300 starts when the datapath daemon receives (at 2350) a packet to be processed and the launches the datapath pipeline.

The process then reads (at 2360) and applies configuration data stored in the copy of the database pointed to by the read pointer of the datapath daemon. The process also processes (at 2370) the packet to completion through all stages of the pipeline (run-to-completion). The operations of the process 2301 ensure that the configuration data being applied will not be corrupted by any update to the datapath configuration database.

Next, the process determines (at 2375) whether the other copy of the database has updated configuration data. If the other copy of the database does not have a newer version of the configuration data, the process 2302 ends. If the other copy of the database does have a newer version of the configuration data, the process flips (at 2380) the read pointer to point to the other copy of the database. The process 2302 then ends.

IV. Software Architecture

Figure 24:
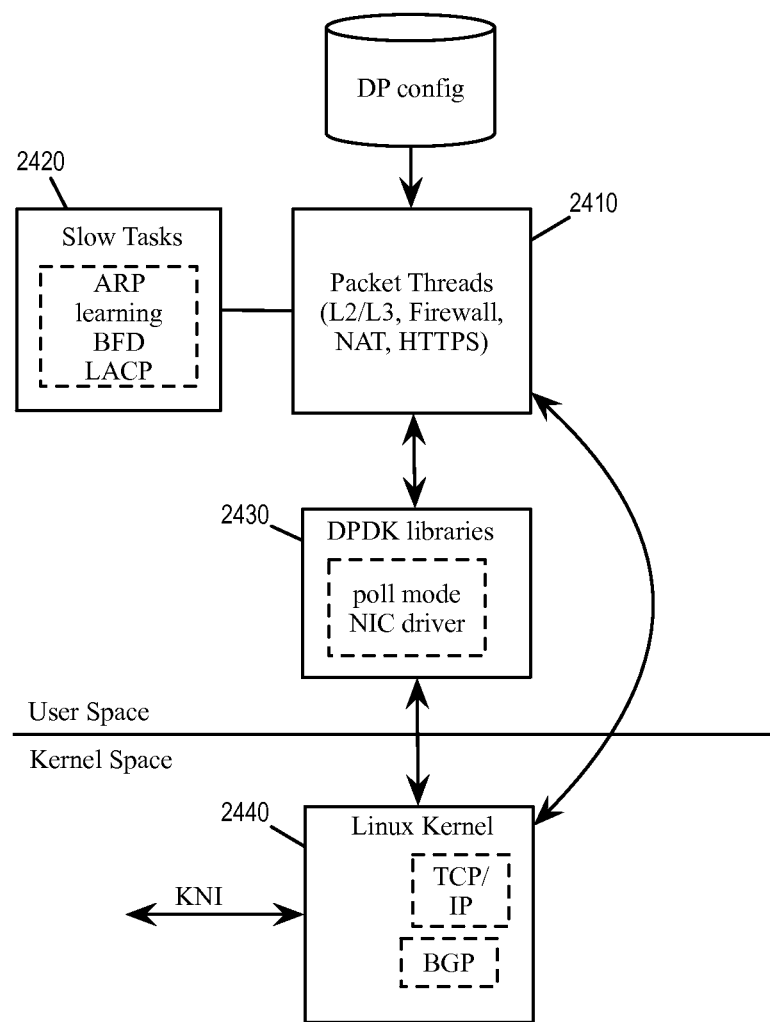
FIG. 24 illustrates the architecture of a gateway machine according to some embodiments of the invention.

FIG. 24 illustrates the architecture of a gateway machine 2400 according to some embodiments of the invention. The memory usage of the gateway machine is divided into user space and kernel space. The kernel space is reserved for running a privileged operating system kernel, kernel extensions, and most device drivers. User space is the memory area where application software and some drivers execute.

As illustrated, the packet processing threads 2410 (i.e., the datapath daemon) is operating in the user space for handling L2 switching, L3 routing, and services such as Firewall, NAT, and HTTPS. Other service tasks such as ARP (address resolution request) learning, BFD (bidirectional forwarding detection) are considered slower running and therefore handled by separate processes 2420 in the user space. These slower tasks are not handled by the datapath daemon and are not part of the datapath pipeline. The packet processing threads 2410 relies on a set of DPDK libraries 2430 (Data Plane Development Kit® by Intel®) for receiving packets from the NIC. In some embodiments, the NIC operations relies on a user space NIC driver that uses poll mode to receive packets.

In the kernel space, an operating system kernel 2440 (e.g., Linux) operates TCP/IP stacks and handles BGP stack (border gateway protocol) for exchanging routing information the external network. Some embodiments use KNI (kernel NIC Interface) to allow user space applications access to the kernel space stacks.

As mentioned, the gateway machine in some embodiments is implemented by using a processor having multiple cores, and that each datapath daemon performs all of its pipeline stages in a RTC (run-to-completion) thread at one core. In some embodiments, a datapath daemon may insert a service pipeline stage that is performed by service processes performed by another thread at another core.

Figure 25A:
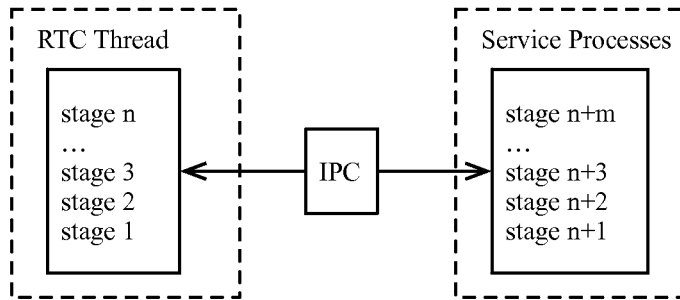
FIG. 25a conceptually illustrates a RTC thread using IPC to communicate with service processes in order to provide services.

In some embodiments, these service processes communicate with the RTC threads using some form of inter-process communications (IPC) such as shared memory or socket. A RTC thread receives packets from NICs, performs the regular L2/L3 forwarding, and classifies packet to determine if a packet requires a service. When a packet requires a service, the packet is sent to the corresponding service process via IPC channel. The IPC service process dequeues and processes the packets. After processing a packet, the service process passes it back to the RTC threads, which continues processing the packet (and may send the packet to another service process for other services.) Effectively, the RTC threads are used to provide basic forwarding and steer packets between service processes. FIG. 25a conceptually illustrates a RTC thread using IPC to communicate with service processes in order to provide services.

In some other embodiments, a service process runs within a container and does not use IPC to communicate with the RTC thread and is in fact unaware of the RTC threads. The process opens standard TCP/UDP socket to send and receive packets from Linux kernel. Instead of using IPC to communicate between service process and RTC threads, tun/tap devices or KNI devices are created within the container. Routing table for the container is properly populated so that packets sent by service process can be routed using the proper tun/tap/KNI devices.

Figure 25B:
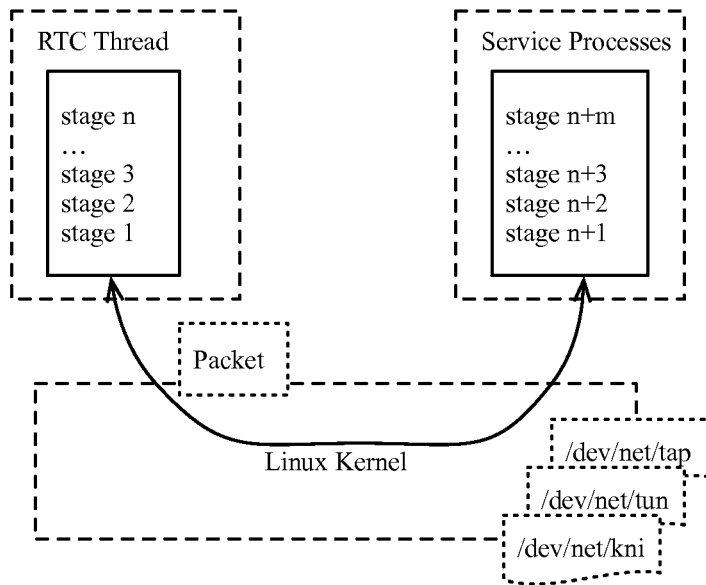
FIG. 25b conceptually illustrates a RTC thread using Linux Kernel to communicate with service processes in order to provide services.

When a RTC thread decides that a packet needs a service, it sends the packet to Linux kernel. After receiving the packet, Linux kernel processes it as if it is received from a NIC. Eventually the packet is delivered to the service process. When the service process finishes processing the packet, it sends the packet to the socket. The packet will be routed by Linux kernel towards one of the tun/tap/KNI devices and will be received by the RTC thread. FIG. 25*b* conceptually illustrates a RTC thread using Linux Kernel to communicate with service processes in order to provide services.

V. Computing Device & Virtualization Software

Figure 26:
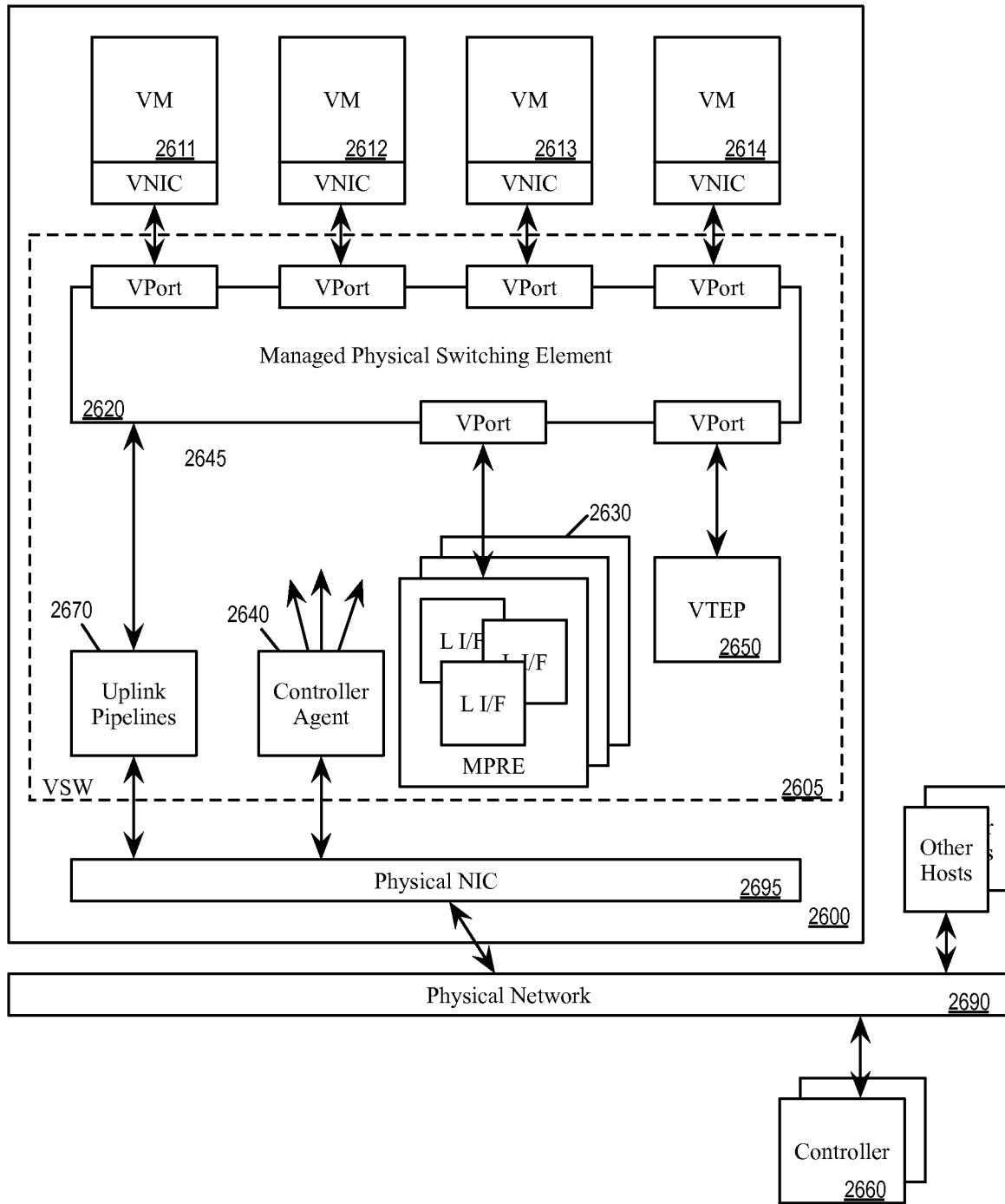
FIG. 26 illustrates a computing device that serves as a host machine that runs virtualization software for some embodiments of the invention.

Virtualization software, also known as managed forwarding element (MFE) or hypervisors, allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 26 illustrates a computing device 2600 that serves as a host machine (or host physical endpoint) that runs virtualization software for some embodiments of the invention.

As illustrated, the computing device 2600 has access to a physical network 2690 through a physical NIC (PNIC) 2695. The host machine 2600 also runs the virtualization software 2605 and hosts VMs 2611-2614. The virtualization software 2605 serves as the interface between the hosted VMs and the physical NIC 2695 (as well as other physical resources, such as processors and memory). Each of the VMs includes a virtual NIC (VNIC) for accessing the network through the virtualization software 2605. Each VNIC in a VM is responsible for exchanging packets between the VM and the virtualization software 2605. In some embodiments, the VNICs are software abstractions of physical NICs implemented by virtual NIC emulators.

The virtualization software 2605 manages the operations of the VMs 2611-2614, and includes several components for managing the access of the VMs to the physical network (by implementing the logical networks to which the VMs connect, in some embodiments). As illustrated, the virtualization software includes several components, including a MPSE 2620, a set of MPREs 2630, a controller agent 2640, a VTEP 2650, and a set of uplink pipelines 2670.

The VTEP (VXLAN tunnel endpoint) 2650 allows the host machine 2600 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 2600 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 2670.

The controller agent 2640 receives control plane messages from a controller or a cluster of controllers. In some embodiments, these control plane message includes configuration data for configuring the various components of the virtualization software (such as the MPSE 2620 and the MPREs 2630) and/or the virtual machines. In the example illustrated in FIG. 26, the controller agent 2640 receives control plane messages from the controller cluster 2660 from the physical network 2690 and in turn provides the received configuration data to the MPREs 2630 through a control channel without going through the MPSE 2620. However, in some embodiments, the controller agent 2640 receives control plane messages from a direct data conduit (not illustrated) independent of the physical network 2690. In some other embodiments, the controller agent receives control plane messages from the MPSE 2620 and forwards configuration data to the router 2630 through the MPSE 2620.

The MPSE 2620 delivers network data to and from the physical NIC 2695, which interfaces the physical network 2690. The MPSE also includes a number of virtual ports (vPorts) that communicatively interconnects the physical NIC with the VMs 2611-2614, the MPREs 2630 and the controller agent 2640. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 2690 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 2630 perform L3 routing on data packets received from a virtual port on the MPSE 2620. In some embodiments, this routing operation entails resolving L3 IP address to a next-hop L2 MAC address and a next-hop VNI (i.e., the VNI of the next-hop's L2 segment). Each routed data packet is then sent back to the MPSE 2620 to be forwarded to its destination according to the resolved L2 MAC address. This destination can be another VM connected to a virtual port on the MPSE 2620, or a reachable L2 network element on the physical network 2690 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 2630 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 2670 relays data between the MPSE 2620 and the physical NIC 2695. The uplink module 2670 includes an egress chain and an ingress chain that each performs a number of operations. Some of these operations are pre-processing and/or post-processing operations for the MPRE 2630. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 26, the virtualization software 2605 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 2620, and hence a same L2 MAC address (vMAC or pMAC). In some other embodiments, each different MPRE belonging to a different tenant has its own port to the MPSE.

The MPSE 2620 and the MPRE 2630 make it possible for data packets to be forwarded amongst VMs 2611-2614 without being sent through the external physical network 2690 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 2600 (and its virtualization software 2605) is able to direct packets of different logical networks to their correct destinations and effectively segregates traffic of different logical networks from each other.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 27:
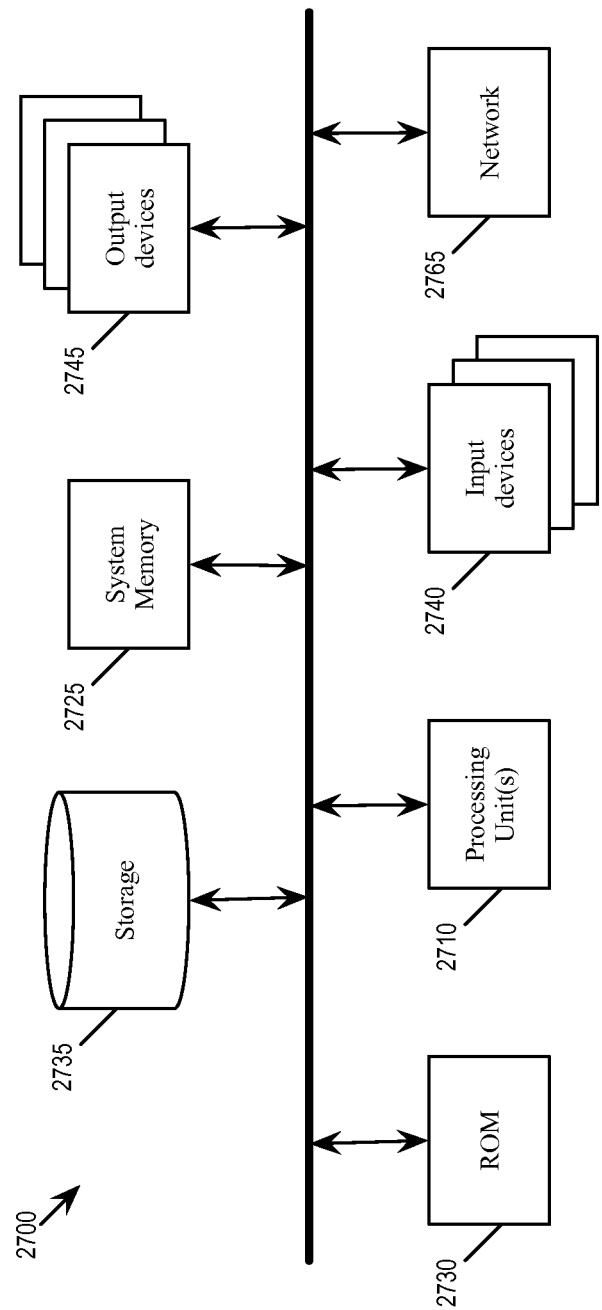
FIG. 27 conceptually illustrates an electronic system with which some embodiments of the invention are implemented.

FIG. 27 conceptually illustrates an electronic system 2700 with which some embodiments of the invention are implemented. The electronic system 2700 can be used to execute any of the control, virtualization, or operating system applications described above. The electronic system 2700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2700 includes a bus 2705, processing unit(s) 2710, a system memory 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the system memory 2725, and the permanent storage device 2735.

From these various memory units, the processing unit(s) 2710 retrieves instructions to execute and data to process in order to execute the processes of the invention. The processing unit(s) may be a single processor or a multi-core processor in different embodiments.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, etc.) as the permanent storage device. Like the permanent storage device 2735, the system memory 2725 is a read-and-write memory device. However, unlike storage device 2735, the system memory is a volatile read-and-write memory, such a random access memory. The system memory stores some of the instructions and data that the processor needs at runtime. In some embodiments, the invention's processes are stored in the system memory 2725, the permanent storage device 2735, and/or the read-only memory 2730. From these various memory units, the processing unit(s) 2710 retrieves instructions to execute and data to process in order to execute the processes of some embodiments.

The bus 2705 also connects to the input and output devices 2740 and 2745. The input devices enable the user to communicate information and select commands to the electronic system. The input devices 2740 include alphanumeric keyboards and pointing devices (also called "cursor control devices"). The output devices 2745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 27, bus 2705 also couples electronic system 2700 to a network 2765 through a network adapter (not shown). In this manner, the computer can be a part of a network of computers (such as a local area network ("LAN"), a wide area network ("WAN"), or an Intranet, or a network of networks, such as the Internet. Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 5, 14, 20, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for implementing a gateway datapath that processes data messages sent between (i) a provider network on which one or more logical networks are implemented and (ii) an external physical network, the method comprising:
   receiving a first data message from the external physical network;
   executing a set of pipeline stages based on content of the data message, each pipeline stage of the set of pipeline stages corresponding to a different logical forwarding element (LFE) of a particular logical network, wherein executing a particular pipeline stage comprises making a function call and receiving configuration data for the particular LFE to which the particular pipeline stage corresponds; and
   based on the executed set of pipeline stages, outputting the data message to the provider network for transmission to a destination of the data message.

2. The method of claim 1, wherein the LFEs of the particular logical network comprise at least (i) a logical router and (ii) a logical switch, wherein the destination of the data message connects to the logical switch.

3. The method of claim 2, wherein (i) the configuration data for a pipeline stage corresponding to the logical router comprises a routing table and (ii) the configuration data for a pipeline stage corresponding to the logical switch comprises forwarding table entries.

4. The method of claim 2, wherein executing a pipeline stage for the logical router comprises identifying an egress port of the logical router based on (i) the configuration data for the logical router and (ii) a destination network address of the data message.

5. The method of claim 4, wherein the logical router is a first logical router that connects to the external physical network, wherein the LFEs of the particular logical network comprise a second logical router interposed between the first logical router and the logical switch.

6. The method of claim 1 further comprising executing at least one pipeline stage corresponding to a stateful transport layer service.

7. The method of claim 1 further comprising executing at least one pipeline stage corresponding to an application layer service.

8. The method of claim 1, wherein executing the set of pipeline stages comprises encapsulating the packet for the particular logical network.

9. The method of claim 1, wherein the particular logical network is a first logical network implemented on the provider network, the data message is a first data message, and the set of pipeline stages is a second set of pipeline stages, the method further comprising:
   receiving a second data message from the external physical network;
   executing a second set of pipeline stages based on content of the second data message, each pipeline stage of the second set of pipeline stages corresponding to a different LFE of a second logical network implemented on the provider network; and
   based on the executed second set of pipeline stages, outputting the second data message to the provider network for transmission to a destination of the data message.

10. The method of claim 9, wherein the first set of pipeline stages and the second set of pipeline stages comprise different sets of function calls.

11. A non-transitory machine readable medium storing a program which when executed by at least one processing unit implements a gateway datapath that processes data messages sent between (i) a provider network on which one or more logical networks are implemented and (ii) an external physical network, the program comprising sets of instructions for:
   receiving a first data message from the external physical network;
   executing a set of pipeline stages based on content of the data message, each pipeline stage of the set of pipeline stages corresponding to a different logical forwarding element (LFE) of a particular logical network, wherein executing a particular pipeline stage comprises making a function call and receiving configuration data for the particular LFE to which the particular pipeline stage corresponds; and
   based on the executed set of pipeline stages, outputting the data message to the provider network for transmission to a destination of the data message.

12. The non-transitory machine readable medium of claim 11, wherein the LFEs of the particular logical network comprise at least (i) a logical router and (ii) a logical switch, wherein the destination of the data message connects to the logical switch.

13. The non-transitory machine readable medium of claim 12, wherein (i) the configuration data for a pipeline stage corresponding to the logical router comprises a routing table and (ii) the configuration data for a pipeline stage corresponding to the logical switch comprises forwarding table entries.

14. The non-transitory machine readable medium of claim 12, wherein execution of the pipeline stage for the logical router identifies an egress port of the logical router based on (i) the configuration data for the logical router and (ii) a destination network address of the data message.

15. The non-transitory machine readable medium of claim 14, wherein the logical router is a first logical router that connects to the external physical network, wherein the LFEs of the particular logical network comprise a second logical router interposed between the first logical router and the logical switch.

16. The non-transitory machine readable medium of claim 11, wherein the program further comprises a set of instructions for executing at least one pipeline stage corresponding to a stateful transport layer service.

17. The non-transitory machine readable medium of claim 11, wherein the program further comprises a set of instructions for executing at least one pipeline stage corresponding to an application layer service.

18. The non-transitory machine readable medium of claim 11, wherein the set of instructions for executing the set of pipeline stages comprises a set of instructions for encapsulating the packet for the particular logical network.

19. The non-transitory machine readable medium of claim 11, wherein the particular logical network is a first logical network implemented on the provider network, the data message is a first data message, and the set of pipeline stages is a second set of pipeline stages, the program further comprising sets of instructions for:

receiving a second data message from the external physical network;

executing a second set of pipeline stages based on content of the second data message, each pipeline stage of the second set of pipeline stages corresponding to a different LFE of a second logical network implemented on the provider network; and based on the executed second set of pipeline stages, outputting the second data message to the provider network for transmission to a destination of the data message.

20. The non-transitory machine readable medium of claim 19, wherein the first set of pipeline stages and the second set of pipeline stages comprise different sets of function calls.

* * * * *